United States Patent
Hara et al.

(10) Patent No.: US 7,683,767 B2
(45) Date of Patent: Mar. 23, 2010

(54) CONTROL DEVICE FOR CONTROLLING IN-VEHICLE UNIT

(75) Inventors: Tetsuya Hara, Okazaki (JP); Kosuke Hara, Tokyo (JP); Hirotoshi Iwasaki, Tokyo (JP); Motoyasu Sakashita, Tokyo (JP)

(73) Assignee: DENSO CORPORATION, Kariya (JP)

( * ) Notice: Subject to any disclaimer, the term of this patent is extended or adjusted under 35 U.S.C. 154(b) by 303 days.

(21) Appl. No.: 11/711,150

(22) Filed: Feb. 27, 2007

(65) Prior Publication Data

US 2007/0273492 A1    Nov. 29, 2007

(30) Foreign Application Priority Data

Mar. 2, 2006    (JP) .............................. 2006-055902

(51) Int. Cl.
*B60Q 1/00*    (2006.01)
(52) U.S. Cl. ........................... 340/438; 340/439
(58) Field of Classification Search ................ 340/438, 340/439
See application file for complete search history.

(56) References Cited

U.S. PATENT DOCUMENTS

2002/0120374 A1* 8/2002 Douros et al. ................. 701/29
2003/0191568 A1* 10/2003 Breed ........................... 701/36

* cited by examiner

*Primary Examiner*—Jennifer Mehmood
(74) *Attorney, Agent, or Firm*—Posz Law Group, PLC

(57) ABSTRACT

A vehicular control device includes (i) situation detection units that detect situation of the vehicle, occupants, or a surrounding area; (ii) a storage unit for storing a model representing association between variables indicating the situation and variables indicating presence or absence of operation needs for each in-vehicle unit, (iii) an inference execution unit that determines presence or absence of the operation needs for each in-vehicle unit using the stored model; (iv) a control unit that controls each in-vehicle unit based on a result of determination by the inference execution unit; (v) an operation detection unit that detects the operation of each in-vehicle unit; and (vi) a model learning unit that learns the stored model using the detected situation when the operation of each in-vehicle unit is detected by the operation detection unit, and an event involving the presence of operation needs for the in-vehicle unit.

31 Claims, 16 Drawing Sheets

| FELLOW PASSENGER | LIVELIHOOD SPHERE | AMOUNT OF RAINFALL | LIGHT. ILLUMINANCE |
|---|---|---|---|
| PRESENCE | TRUE | 5 | 5 |
| ABSENCE | FALSE | 3 | 7 |
| PRESENCE | TRUE | 0 | 8 |
| ABSENCE | FALSE | 0 | 3 |

| FELLOW PASSENGER | LIVELIHOOD SPHERE | AMOUNT OF RAINFALL | LIGHT. ILLUMINANCE |
|---|---|---|---|
| PRESENCE | TRUE | TRUE | 5 |
| ABSENCE | FALSE | TRUE | 7 |
| PRESENCE | TRUE | FALSE | 8 |
| ABSENCE | FALSE | FALSE | 3 |

FIG. 8A

| | FELLOW PASSENGER | PRESENCE | | | | ABSENCE | | | |
|---|---|---|---|---|---|---|---|---|---|
| | LIVELIHOOD SPHERE | FALSE | | TRUE | | FALSE | | TRUE | |
| | AMOUNT OF RAINFALL | FALSE | TRUE | FALSE | TRUE | FALSE | TRUE | FALSE | TRUE |
| LIGHT. ILLUMINANCE | 0 | 0 | 0 | 0 | 0 | 0 | 0 | 0 | 0 |
| | 1 | 0 | 0 | 0 | 0 | 0 | 0 | 0 | 0 |
| | 2 | 0 | 0 | 0 | 0 | 0 | 0 | 0 | 0 |
| | 3 | 0 | 0 | 0 | 0 | 1 | 0 | 0 | 0 |
| | 4 | 0 | 0 | 0 | 0 | 0 | 0 | 0 | 0 |
| | 5 | 0 | 0 | 0 | 1 | 0 | 0 | 0 | 0 |
| | 6 | 0 | 0 | 0 | 0 | 0 | 0 | 0 | 0 |
| | 7 | 0 | 0 | 0 | 0 | 0 | 1 | 0 | 0 |
| | 8 | 0 | 0 | 1 | 0 | 0 | 0 | 0 | 0 |
| | 9 | 0 | 0 | 0 | 0 | 0 | 0 | 0 | 0 |

FIG. 8B

| | FELLOW PASSENGER | PRESENCE | | | | ABSENCE | | | |
|---|---|---|---|---|---|---|---|---|---|
| | LIVELIHOOD SPHERE | FALSE | | TRUE | | FALSE | | TRUE | |
| | AMOUNT OF RAINFALL | FALSE | TRUE | FALSE | TRUE | FALSE | TRUE | FALSE | TRUE |
| LIGHT. ILLUMINANCE | 0 | 1 | 1 | 1 | 1 | 1 | 1 | 1 | 1 |
| | 1 | 1 | 1 | 1 | 1 | 1 | 1 | 1 | 1 |
| | 2 | 1 | 1 | 1 | 1 | 1 | 1 | 1 | 1 |
| | 3 | 1 | 1 | 1 | 1 | 1 | 1 | 1 | 1 |
| | 4 | 1 | 1 | 1 | 1 | 1 | 1 | 1 | 1 |
| | 5 | 1 | 1 | 1 | 1 | 1 | 1 | 1 | 1 |
| | 6 | 1 | 1 | 1 | 1 | 1 | 1 | 1 | 1 |
| | 7 | 1 | 1 | 1 | 1 | 1 | 1 | 1 | 1 |
| | 8 | 1 | 1 | 1 | 1 | 1 | 1 | 1 | 1 |
| | 9 | 1 | 1 | 1 | 1 | 1 | 1 | 1 | 1 |

FIG. 9A

| | FELLOW PASSENGER | PRESENCE | | | | ABSENCE | | | |
|---|---|---|---|---|---|---|---|---|---|
| | LIVELIHOOD SPHERE | FALSE | | TRUE | | FALSE | | TRUE | |
| | AMOUNT OF RAINFALL | FALSE | TRUE | FALSE | TRUE | FALSE | TRUE | FALSE | TRUE |
| LIGHT. ILLUMINANCE | 0 | 1 | 1 | 1 | 1 | 1 | 1 | 1 | 1 |
| | 1 | 1 | 1 | 1 | 1 | 1 | 1 | 1 | 1 |
| | 2 | 1 | 1 | 1 | 1 | 1 | 1 | 1 | 1 |
| | 3 | 1 | 1 | 1 | 1 | 2 | 1 | 1 | 1 |
| | 4 | 1 | 1 | 1 | 1 | 1 | 1 | 1 | 1 |
| | 5 | 1 | 1 | 1 | 2 | 1 | 1 | 1 | 1 |
| | 6 | 1 | 1 | 1 | 1 | 1 | 1 | 1 | 1 |
| | 7 | 1 | 1 | 1 | 1 | 1 | 2 | 1 | 1 |
| | 8 | 1 | 1 | 2 | 1 | 1 | 1 | 1 | 1 |
| | 9 | 1 | 1 | 1 | 1 | 1 | 1 | 1 | 1 |

FIG. 9B

| | FELLOW PASSENGER | PRESENCE | | | | ABSENCE | | | |
|---|---|---|---|---|---|---|---|---|---|
| | LIVELIHOOD SPHERE | FALSE | | TRUE | | FALSE | | TRUE | |
| | AMOUNT OF RAINFALL | FALSE | TRUE | FALSE | TRUE | FALSE | TRUE | FALSE | TRUE |
| LIGHT. ILLUMINANCE | 0 | 0.10 | 0.10 | 0.09 | 0.09 | 0.09 | 0.09 | 0.10 | 0.10 |
| | 1 | 0.10 | 0.10 | 0.09 | 0.09 | 0.09 | 0.09 | 0.10 | 0.10 |
| | 2 | 0.10 | 0.10 | 0.09 | 0.09 | 0.09 | 0.09 | 0.10 | 0.10 |
| | 3 | 0.10 | 0.10 | 0.09 | 0.09 | 0.18 | 0.09 | 0.10 | 0.10 |
| | 4 | 0.10 | 0.10 | 0.09 | 0.09 | 0.09 | 0.09 | 0.10 | 0.10 |
| | 5 | 0.10 | 0.10 | 0.09 | 0.18 | 0.09 | 0.09 | 0.10 | 0.10 |
| | 6 | 0.10 | 0.10 | 0.09 | 0.09 | 0.09 | 0.09 | 0.10 | 0.10 |
| | 7 | 0.10 | 0.10 | 0.09 | 0.09 | 0.09 | 0.18 | 0.10 | 0.10 |
| | 8 | 0.10 | 0.10 | 0.18 | 0.09 | 0.09 | 0.09 | 0.10 | 0.10 |
| | 9 | 0.10 | 0.10 | 0.09 | 0.09 | 0.09 | 0.09 | 0.10 | 0.10 |

FIG. 13

| | | USER | SITUATION | | SW/SERVICE | | | | ATTRIBUTE OF SERVICE | |
|---|---|---|---|---|---|---|---|---|---|---|
| DATA | TIME | SEX | WEATHER | ENTRY INTO GS | WIPER OFF | AUDIO ON | AUDIO OFF | ... | WANT TO STOP UNIT | WANT TO BE QUIET |
| 2006/2/3 | 10:30 | MALE | RAINY | TRUE | TRUE | FALSE | FALSE | | TRUE | FALSE |
| 2006/2/3 | 10:31 | MALE | RAINY | TRUE | FALSE | FALSE | TRUE | | FALSE | TRUE |
| 2006/2/3 | 10:45 | MALE | RAINY | FALSE | FALSE | TRUE | FALSE | | FALSE | FALSE |
| | | | | | | | | | | |
| 2006/2/10 | 0:30 | MALE | RAINY | TRUE | TRUE | FALSE | FALSE | | FALSE | FALSE |
| 2006/2/10 | 0:31 | MALE | RAINY | TRUE | FALSE | FALSE | TRUE | | FALSE | FALSE |

D1: rows 2006/2/3
D2: rows 2006/2/10

| PURPOSE OF USE | IN-VEHICLE |
| --- | --- |
| VENTILATING AIR | POWER WINDOW ACTUATOR (OPEN) |
| | CONDITIONER AIR EXCHANGE ACTUATOR (ON) |
| MAKING EXTERNAL NOISE LESS IRRITATING | POWER WINDOW ACTUATOR (CLOSE) |
| | AUDIO (ON) |

| AMOUNT OF RAINFALL | ILLUMINANCE | LIGHT |
|---|---|---|
| 0 | 5 | ON |
| 3 | 7 | OFF |
| 5 | 8 | OFF |
| 4 | 3 | ON |
| 0 | 6 | OFF |
| 0 | 7 | OFF |
| 0 | 8 | OFF |
| 4 | 3 | ON | ically is made by

CONTROL DEVICE FOR CONTROLLING IN-VEHICLE UNIT

CROSS REFERENCE TO RELATED APPLICATION

This application is based on and incorporates herein by reference Japanese Patent Application No. 2006-55902 filed on Mar. 2, 2006.

FIELD OF THE INVENTION

The present invention relates to a control device that controls multiple in-vehicle units mounted in a vehicle.

BACKGROUND OF THE INVENTION

There are conventionally known devices that control multiple in-vehicle units mounted in a vehicle according to the situation. For example, Patent Document 1 discloses a vehicle agent system in which various units mounted in a vehicle can be effectively utilized without troubling the driver. Here, driver information storing means is provided to beforehand store correspondences between conditions, such as instructions and situations, and in-vehicle units suitable for the conditions. When an instruction is given from a driver or the situation changes, an in-vehicle unit is controlled based on the correspondence stored in the driver information storing means. Further, response determining means is provided to confirm the driver's intention before an in-vehicle unit is controlled; thereby, the correspondence in the driver information storing means is updated according to determination made by the response determining means.

Patent Document 2 discloses a device that estimates the driver's intention and controls an in-vehicle unit based on the result of the estimation to lessen the load on the driver. In the device disclosed in this document, control start conditions and the details of control are stored beforehand in a control information table in correspondence with each other. When the state of the driver satisfies a control start condition stored in the control information table, the control device carries out the details of control in correspondence with it. This document also discloses that a control information table is updated based on change in the state of the driver that occurs when control is carried out, change in the state of operation that occurs when control is canceled, or the like.

Patent Document 1: JP-2003-252130 A
Patent Document 2: JP-2005-329800 A

As mentioned above, there are known control devices that control equipment mounted in a vehicle according to a predetermined condition and control devices that update conditions based on the driver's response to control selected according to the situation or the like. However, the devices disclosed in the above documents involve problems. In these devices, a condition is updated based on whether or not the driver accepts control selected by the device, and the frequency with which a condition is updated is very low.

In the devices disclosed in the above documents, further, a control condition is updated by determining whether or not the correspondence between a condition and control stored in a table is appropriate, based on the result of acceptance by the driver. When predetermined control is carried out under a predetermined condition and the driver does not accept the control, that condition is not suitable for the driver and should not be used from the next time onward. In the devices disclosed in the above documents, to cope with this, a record in which a set of the predetermined condition and control for the condition is stored is substantially deleted from a table. It can be said that the devices disclosed in the above documents can also carry out control suitable for the driver by learning in that control that will be highly probably rejected by the driver is not carried out. However, this update method is disadvantageous. The method is such that a condition unsuitable for the driver is just excluded, and it works only in the direction in which the range of in-vehicle unit control is narrowed.

SUMMARY OF THE INVENTION

The invention has been made with the foregoing taken into account. It is an object of the invention to provide an in-vehicle unit control device wherein the chance and range of learning are increased and control suitable for the driver can be carried out.

According to an aspect of the present invention, a control device in a vehicle is provided as follows. The control device controls in-vehicle units in a vehicle, and includes: a situation detection unit that detects a situation of at least one of (i) the vehicle, (ii) an occupant, and (iii) a surrounding area; an in-vehicle unit operation model storage unit for storing, with respect to each in-vehicle unit of the in-vehicle units, a model that represents association between a variable indicating the situation and a variable indicating presence or absence of operation needs for the each in-vehicle unit as an in-vehicle unit operation model; an inference execution unit that sets the situation detected by the situation detection unit for the variable indicating the situation in the in-vehicle unit operation model with respect to the each in-vehicle unit read from the in-vehicle unit operation model storage unit, and determines presence or absence of operation needs for the each in-vehicle unit; an in-vehicle unit control unit that controls an operation of the each in-vehicle unit based on a result of determining by the inference execution unit; an operation detection unit that detects an operation of the each in-vehicle unit; and a model learning unit that learns the in-vehicle unit operation model stored in the in-vehicle unit operation model storage unit by using (i) a situation detected by the situation detection unit when the operation of the each in-vehicle unit is detected by the operation detection unit, and (ii) an event involving the presence of operation needs for the each in-vehicle unit.

As mentioned above, an in-vehicle unit operation model is learned using the situation of the occupant, the vehicle, or the surrounding area when the operation of an in-vehicle unit is detected by the operation detection unit. Thus, when an in-vehicle unit is operated during operation routinely performed by the driver, a situation in which operation needs occur can be learned. Therefore, the chance to learn the in-vehicle unit operation model is dramatically increased. The invention may be so constructed that learning is carried out when operation is detected by the operation detection unit or that a situation in which operation is detected is stored as a history and learning is carried out later. A model that represents the dependence between multiple variables indicating the situation and operation needs for an in-vehicle unit is learned using the situation detected when the in-vehicle unit is operated. Therefore, it is possible to add a variable indicating a situation not contained in an in-vehicle unit operation model at the beginning, and update the model and make it more suitable for the driver.

Examples of the "situation of an occupant" include the direction of line of sight, habit, purpose of driving (commuting, travel, etc.), emotion, physical information (tired, etc.), past event, or the like. A driver's destination can be predicted using the driver's habit, and operation needs can be inferred using future information. When a destination is situated far away, for example, needs for fueling are increased even though much fuel remains. An example of past event is an event that occurred to the driver in the past, such as that the driver went skiing yesterday. Thus, it can be detected, for example, that there are needs for car wash. The "situation of an occupant" includes not only the situation of the driver but also the situation of a fellow passenger. A pet may be included in fellow passengers. Examples of the "situation of a vehicle" include the temperature in the vehicle compartment, the state of operation of an air conditioner, the remaining quantity of fuel, running speed, turn-on/off of a radio or audio, the state of operation of a wiper, headlamps, the opening/closing of windows, the state of locking, or the like. Examples of the "situation of a surrounding area" include the lightness of exterior, present time, the situation of traffic jam, the classification of road (expressway, urban road, etc.), geographical situation (uphill, downhill, tunnel, etc.), the state of rainfall, or the like. The multiple situation detection units respectively have a function of detecting various situations related to the occupant, the vehicle, and the surrounding area, mentioned above as examples. The more situations are detected with more situation detection units, the more elaborately in-vehicle units can be controlled.

The above-mentioned control device further includes a driver attribute storage unit for storing an attribute of a driver of the vehicle. The above in-vehicle unit operation model storage unit further stores, with respect to the each in-vehicle unit, a model that represents association between a variable indicating the attribute, the variable indicating the situation, and the variable indicating presence or absence of operation needs for the each in-vehicle unit as the in-vehicle unit operation model. The inference execution unit further sets the attribute read from the driver attribute storage unit for the variable indicating the attribute in the in-vehicle unit operation model before determining presence or absence of operation needs. The model learning unit learns the in-vehicle unit operation model by further using the attribute read from the driver attribute storage unit.

Thus, it is possible to add a variable indicating the situation not contained in an in-vehicle unit operation model at the beginning, and update the model and make it more suitable for the driver. In addition, a variable indicating the attributes of the driver is included in an in-vehicle unit operation model, and inference is carried out and a model is learned using the attributes of the driver. Therefore, it is possible to carry out elaborate in-vehicle unit control in accordance with the attributes of the driver. Examples of the "attribute of the driver" include the driver's age, sex, visual acuity, years of driving experience, personality, taste, and the like.

Inference and learning may be carried out using history information or a model related to another driver whose degree of similarity with the relevant driver is at a certain level or higher. Aside from driver attributes, a situation or history information may be used to measure the degree of similarity with the driver.

In the above control device, the in-vehicle unit control unit may include an operation inquiry unit that, when the presence of operation needs is determined by the inference execution unit, inquires of a driver of the vehicle whether or not the each in-vehicle unit is allowed to be operated. When permission to operate the each in-vehicle unit is inputted in response to an inquiry from the operation inquiry unit, the each in-vehicle unit is operated.

Operation of an in-vehicle unit the driver does not intend can be prevented by the operation inquiry unit inquiring the driver's intention, as mentioned above.

The above operation inquiry unit may output a variable indicating the situation that contributes most to the operation needs in determining by the inference execution unit, as a reason for determining presence of operation needs for the each in-vehicle unit.

When a reason why operation needs for an in-vehicle unit are detected is outputted, as mentioned above, the driver can understand the reason why the in-vehicle unit should be operated. This makes it possible for the driver to easily decide whether to operate an in-vehicle unit.

In the above control device, the operation inquiry unit may change the mode in which an inquiring message is outputted according a magnitude of operation needs determined by the inference execution unit.

By changing the mode of output according to the magnitude of operation needs, as mentioned above, the driver can be appropriately notified of the operation needs. For example, when the magnitude of operation needs is large, such as lights being turned on when the relevant vehicle enters a tunnel, an inquiring message is displayed in large size, both voice and display are used, or some other like means is taken to notify the driver that a corresponding in-vehicle unit is operated. When the magnitude of operation needs is not so large, conversely, the driver is notified by display in reduced size and thus it can be avoided to hinder driving.

In the above control device, the operation inquiry unit may change the mode in which an inquiring message is outputted according to the factor of certainty of operation needs determined by the inference execution unit.

By changing the mode of output according to the factor of certainty of operation needs, as mentioned above, the driver can be prevented from being troubled by uncertain operation needs and appropriate notification can be carried out. The "factor of certainty" refers to the probability that an estimated result is wrong. A factor of certainty can be determined through the quantity of learning samples, prior distribution, or the like. When it is determined through learning samples, for example, the factor of certainty is increased with increase in the number of learning samples.

In the above control device, the inference execution unit may determine the presence or absence of operation needs for the each in-vehicle unit based on a result of an inquiry about whether or not the operation of the each in-vehicle unit is allowed by the driver. The in-vehicle unit operation model stored in the model storage unit may be learned using the determined presence or absence of operation needs.

With this construction, it is possible to detect the presence or absence of operation needs for an in-vehicle unit with the operation inquiry unit and to learn a model using the presence or absence of operation needs.

In the above control device, when the in-vehicle unit control unit operates an in-vehicle unit based on the result of determining by the inference execution unit and the operation of the in-vehicle unit is thereafter stopped by a driver of the vehicle within a predetermined time, the model learning unit may learn the in-vehicle unit operation model stored in the in-vehicle unit operation model storage unit using an event involving the absence of operation needs.

When the operation of an in-vehicle unit is stopped by the driver within a predetermined time, as mentioned above, it can be thought that the driver does not desire to operate that in-vehicle unit. Therefore, an in-vehicle unit operation model can be learned using an event involving the absence of operation needs.

The control device may include an operation infeasible situation storage unit for storing information indicating a situation in which operation is infeasible with respect to each of the in-vehicle units. The in-vehicle unit control unit performs the following operation before operating an in-vehicle unit: it reads a situation in which operation is infeasible corresponding to the in-vehicle unit from the operation infeasible situation storage unit; it determines whether or not the situation detected by the situation detection unit agrees with the situation read from the operation infeasible situation storage unit; and when it is determined that the detected situation does not agree with the situation in which the in-vehicle unit cannot be operated, it operates the in-vehicle unit.

With a construction in which the presence of operation needs is determined through inference, it can be erroneously inferred that there are operation needs in a situation in which a relevant in-vehicle unit cannot be operated, for example, when it is inferred during running that there are operation needs to open the filler cap. To solve this problem, the following control is carried out: based on the situation detected by the situation detection unit, it is determined whether or not the operation of an in-vehicle unit is infeasible; and when the in-vehicle unit cannot be operated, the in-vehicle unit is not operated.

The control device may be so constructed that when the in-vehicle unit control unit operates an in-vehicle unit, it notifies the driver that that in-vehicle unit will be operated.

By notifying that an in-vehicle unit will be operated, as mentioned above, it is possible to call the driver and fellow passenger's attention. For example, when a window is to be closed or on other like occasions, notification of "the window will be closed" is given. Thus, the driver and the fellow passenger can know that it is dangerous to stick their hand or face out of the window.

The above control device may include an in-vehicle unit operation model display unit. This display unit displays an in-vehicle unit operation model stored in the in-vehicle unit operation model storage unit as the following model: a display model in which a variable indicating the situation of the occupant, the vehicle, or the surrounding area and a variable indicating the presence or absence of the operation needs for an in-vehicle unit are taken as nodes, and the association or dependence between them is indicated as a directed link that connects these nodes.

Since an in-vehicle unit operation model is displayed as a display model that is constructed of nodes and a directed link and can be visually understood with ease, the driver can understand the in-vehicle unit operation model.

An in-vehicle unit operation model modification unit may be provided which makes it possible to delete a node, add a new node, or modify a directed link, with respect to a display model on the in-vehicle unit operation model display unit. Then, an in-vehicle unit operation model modified by the in-vehicle unit operation model modification unit is stored in the in-vehicle unit operation model storage unit.

With this construction, the driver can directly modify a model to create a model suited to him/her.

The above control device may include a purpose of use storage unit for storing a purpose of use of each of the in-vehicle units, and a needs model storage unit for storing a needs model that represents the association or dependence between a variable indicating the situation of the occupant, the vehicle, or the surrounding area and a variable indicating needs in that situation with respect to each of the needs. The control device may be so constructed that the following is implemented: the inference execution unit sets the situation detected by the situation detection unit for a variable indicating the situation of the occupant, the vehicle, or the surrounding area in a needs model read from the needs model storage unit and determines the presence or absence of needs in that situation; when the magnitude of the presence of needs determined by the inference execution unit is larger than a predetermined threshold value, the in-vehicle unit control unit refers to the purpose of use of each in-vehicle unit stored in the purpose of use storage unit and selects an in-vehicle unit utilized to meet the needs, and controls the operation of the selected in-vehicle unit.

By storing the purpose of use of each in-vehicle unit, as mentioned above, it is possible to grasp on what occasions the in-vehicle unit is used. The situation detected by the situation detection unit is set for a needs model and needs are inferred. When the magnitude of the presence of needs is large, an in-vehicle unit utilized to meet the needs is selected by referring to the purpose of use of each in-vehicle unit stored in the purpose of use storage unit. With this construction, even an in-vehicle unit that has not been used in the past is selected depending on the situation; therefore, the degree of utilization of in-vehicle units can be enhanced. A driver who has opened a window to ventilate air in the past will be taken as an example. In a situation in which the vehicle compartment is stuffy, a power window actuator for controlling the opening/closing of a window is operated to open the window. With this construction, needs for "air ventilation" are detected in a situation in which the vehicle compartment is stuffy. When a conditioner air exchange actuator is stored as an in-vehicle unit used to the purpose of "air ventilation," the conditioner air exchange actuator is selected even though the actuator has not been used in the past.

The above control device may include a priority determination model storage unit for storing a model that represents the association or dependence between respective variables indicating operation needs for multiple in-vehicle units and variables indicating the priorities of the multiple in-vehicle units, as a priority determination model. When the result of computation using the in-vehicle unit operation model reveals that there are operation needs for multiple in-vehicle units, the inference execution unit sets the operation needs for multiple in-vehicle units for a priority determination model read from the priority determination model storage unit to determine the priorities of the in-vehicle units. Then, the in-vehicle unit control unit operates an in-vehicle unit of high priority. A priority determination model may be updated by learning. In this case, learning is carried out using, for example, the driver's response to an inquiry about operation as a teacher signal.

By determining the priority of the operation of each in-vehicle unit by a priority determination model, as mentioned above, the following advantage is brought: when there are operation needs for multiple in-vehicle units, an in-vehicle unit of high priority can be determined. Thus, in-vehicle units can be operated in order of priority.

The above control device may include a priority determination model display unit. This display unit displays a priority determination model stored in the priority determination model storage unit as the following model: a display model in which respective variables indicating the operation needs for multiple in-vehicle units and variables indicating the priorities of the multiple in-vehicle units are taken as nodes, and the association or dependence between them is indicated as a directed link that connects these nodes.

Since a priority determination model is displayed as a display model that is constructed of nodes and a directed link and can be visually understood with ease, the driver can understand the priority determination model.

The above control device may include a priority determination model modification unit that makes it possible to delete a node, add a new node, or modify a directed link, with respect to a display model on the priority determination model display unit. Then, a priority determination model modified by the priority determination model modification unit is stored in the priority determination model storage unit.

With this construction, the driver can directly modify a model to create a model suited to him/her.

The above control device may include an operation inquiry unit that inquires the driver whether or not multiple in-vehicle units may be operated in order of priority based on the priorities determined by the inference execution unit. When permission to operate an in-vehicle unit is inputted in response to an inquiry from the operation inquiry unit, the in-vehicle unit is operated.

Thus, when there are operation needs for multiple in-vehicle units, the driver only have to make decision with respect to in-vehicle units of high priority. Therefore, the driver's attention is not diverted, and this contributes to safe driving.

The above control device may include one or more electronic control units (ECUs) for controlling the in-vehicle units and a center ECU that controls the multiple ECUs in a centralized manner. Computation of operation needs for an in-vehicle unit based on the in-vehicle unit operation model is carried out with the ECU for controlling that in-vehicle unit, and computation of priorities based on the priority determination model is carried out with the center ECU.

In general, a vehicle having multiple in-vehicle units is provided with one or more ECUs that control the in-vehicle units. In the invention, a center ECU is provided which controls the individual ECUs in a centralized manner. Processing for determining the presence or absence of operation needs for each in-vehicle unit is carried out with the ECU that controls the in-vehicle unit, and processing for determining the priorities of operation needs for multiple in-vehicle units is carried out with the center ECU. Thus, processing load is distributed among the individual ECUs and the center ECU, and this contributes to the enhancement of processing speed. When there are a large number of ECUs, hierarchical structure may be adopted. In such a case, for example, it is possible to provide a multimedia center ECU, a body center ECU, and an integrated center ECU that controls them in a centralized manner.

ECU built in an automobile navigation system or a head-up display may be used as the center ECU.

Since an automobile navigation system or head-up display includes a processor of high computing power, it can be used as a center ECU.

The above control device may include a service execution model storage unit for storing the following model as a service execution model: a model that represents the association or dependence between a variable indicating the situation of the occupant, the vehicle, or the surrounding area and a variable indicating the presence or absence of execution needs for service in which the operations of multiple in-vehicle units often simultaneously carried out are grouped as one service. The inference execution unit sets the situation detected by the situation detection unit for a variable indicating the situation of the occupant, the vehicle, or the surrounding area in a service execution model read from the service execution model storage unit, and determines the presence or absence of execution needs for the service. The in-vehicle unit control unit controls the operations of the multiple in-vehicle units included in the service based on the result of computation carried out by the inference execution unit.

By grouping the operations of multiple in-vehicle units carried out in a set as one service, as mentioned above, the in-vehicle units can be appropriately operated on a service-by-service basis. For example, a service of "going into a gas station" can be composed by grouping the operations of turning off audio, opening a window, and turning off the wiper. For example, a service of "entering a tunnel" can be composed by grouping the operation of turning on the headlamps and closing the windows.

The above control device may include an operating history storage unit and a model generation unit. The operating history storage unit stores the operating history of an in-vehicle unit and the situation of the occupant, the vehicle, or the surrounding area detected when the in-vehicle unit is operated in correspondence with each other. The model generation unit operates as follows: it searches for a combination of the operations of in-vehicle units carried out in a similar situation from among the operating histories stored in the operating history storage unit; it groups the retrieved combination of the operations of the in-vehicle units as one service; and it generates a service execution model that represents the association or dependence between a variable indicating the situation of the occupant, the vehicle, or the surrounding area and a variable indicating the presence of execution needs for that service.

By detecting a combination of the operations of multiple in-vehicle units carried out in a similar situation based on the past operating histories of the in-vehicle units, as mentioned above, in-vehicle units that can be grouped as a service can be detected. By generating a model in which the detected combination of the operations of in-vehicle units is taken as one service, a service execution model suited to the driver can be generated.

The above control device may include: a driver attribute transmission unit that is connected with a management center having multiple in-vehicle unit operation models different from attribute to attribute of the driver (i.e., multiple attribute-specific in-vehicle unit operation models) so that they can communicate with each other, and transmits information indicating an attribute of the driver to the management center; and a model reception unit that receives the in-vehicle unit operation model corresponding to the driver attribute from the management center.

The following can be implemented by receiving an in-vehicle unit operation model corresponding to an attribute of the driver from the management center: even before a model is learned, in-vehicle units can be controlled using a model suited to the driver to some extent. A model corresponding to an attribute of the driver is, for example, a model corresponding to an attribute of "man in his twenties" or "woman in her twenties." Similarly with in-vehicle unit operation models, priority determination models can also be received from the management center.

The above control device may include: a position information transmission unit that is connected with a management center having multiple in-vehicle unit operation models different from region to region (i.e., multiple region-specific in-vehicle unit operation models) so that they can communicate with each other, and transmits information on the position of the vehicle to the management center; and a model reception unit that receives an in-vehicle unit operation model corresponding to a region containing the position identified by the position information from the management center.

The following can be implemented by receiving an in-vehicle unit operation model or a priority determination model corresponding to a region from the management center, as mentioned above: even before the model is learned, in-vehicle units can be controlled using a model suitable for the region to some extent. An example will be taken. When air is ventilated, the operation to be performed may be different in a warm region and in a cold region. A window may be opened in a warm region, and a conditioner air exchange actuator is used in a cold region. More appropriate control can be carried out by taking regional characteristics into account. Similarly with in-vehicle unit operation models, priority determination models can also be received from the management center.

According to another aspect of the present invention, a control device for controlling in-vehicle units in a vehicle is provided with the following: a situation detection unit that detects a situation of at least one of (i) the vehicle, (ii) an occupant, and (iii) a surrounding area; an in-vehicle unit operation model storage unit for storing, with respect to each in-vehicle unit of the in-vehicle units, a model that represents association between a variable indicating the situation and variables indicating presence or absence of operation needs for the each in-vehicle unit as an in-vehicle unit operation model; an inference execution unit that sets the situation detected by the situation detection unit for the variable indicating the situation in the in-vehicle unit operation model read from the in-vehicle unit operation model storage unit, and determines presence or absence of operation needs for the each in-vehicle unit; an in-vehicle unit control unit that controls an operation of the each in-vehicle unit based on a result of determining by the inference execution unit; and a model learning unit that periodically learns the in-vehicle unit operation model stored in the in-vehicle unit operation model storage unit using (i) the situation detected by the situation detection unit and (ii) an event in which the each in-vehicle unit is operated or not.

As mentioned above, an in-vehicle unit operation model is periodically learned using the situation of the occupant, the vehicle, or the surrounding area and whether or not an in-vehicle unit is operated when the situation is detected. Thus, the chance to learn the in-vehicle unit operation model is dramatically increased. Further, a model that represents the association or dependence between multiple variables indicating the situation and operation needs for an in-vehicle unit is learned using the situation detected when the in-vehicle unit is operated. Therefore, it is possible to add a variable indicating a situation not contained in an in-vehicle unit operation model at the beginning, and update the model and make it more suitable for the driver.

According to another aspect of the present invention, a control device for controlling in-vehicle units in a vehicle is provided with the following: a situation detection unit that detects a situation of at least one of (i) the vehicle, (ii) an occupant, and (iii) a surrounding area; an in-vehicle unit operation model storage unit for storing, with respect to each in-vehicle unit of the in-vehicle units, a model that represents association between a variable indicating the situation and a variable indicating presence or absence of operation needs for the each in-vehicle unit as an in-vehicle unit operation model; an inference execution unit that sets the situation detected by the situation detection unit for the variable indicating the situation in the in-vehicle unit operation model read from the in-vehicle unit operation model storage unit, and determines presence or absence of operation needs for the each in-vehicle unit; an in-vehicle unit control unit that controls an operation of the each in-vehicle unit based on a result of determining by the inference execution unit; and a model learning unit that learns the in-vehicle unit operation model stored in the in-vehicle unit operation model storage unit using (i) a situation detected when the situation detected by the situation detection unit becomes a predetermined state and (ii) an event in which the each in-vehicle unit is operated or not.

As mentioned above, an in-vehicle unit operation model is learned using the situation of the occupant, the vehicle, or the surrounding area and whether or not an in-vehicle unit is operated when the situation is detected, according to change in the situation detected by the situation detection unit. Thus, the change to learn the in-vehicle unit operation model is dramatically increased. The "predetermined state" need not be single, and there may be multiple predetermined states. An example will be taken. It will be assumed that a situation detection unit for detecting exterior illuminance represents the illuminance by a numeric value of 1 to 10. In this case, multiple states can be set as the predetermined state, for example, the state in which the illuminance is "3," "6," or "9" can be set. Further, a model that represents the dependence between multiple variables indicating the situation and operation needs for an in-vehicle unit is learned using the situation detected when the in-vehicle unit is operated. Therefore, it is possible to add a variable indicating a situation not contained in an in-vehicle unit operation model at the beginning, and update the model and make it more suitable for the driver.

According to another aspect of the present invention, a control device for controlling in-vehicle units in a vehicle is provided with the following: a situation detection unit that detects a situation of at least one of (i) the vehicle, (ii) an occupant, and (iii) a surrounding area; a history storage unit for sequentially storing the situation detected by the situation detection unit and whether or not an in-vehicle unit is operated when the situation is detected, as history data; a history retrieval unit that retrieves history data indicating a situation most similar to the situation detected by the situation detection unit from the history storage unit; and an in-vehicle unit control unit that controls an operation of an in-vehicle unit to agree with whether or not the in-vehicle is operated, described in the history data retrieved by the history retrieval unit.

As mentioned above, history data indicating the most similar situation is retrieved from among the history data stored in the history storage unit, and an in-vehicle unit is operated so that the operation agrees with whether or not the in-vehicle unit is operated, described in the retrieved history data. Thus, in-vehicle units can be controlled in accordance with operation needs based on the driver's action in the past. For example, a "basis for distance" can be used to determine the degree of similarity of a situation.

According to another aspect of the present invention, a control device for controlling in-vehicle units in a vehicle is provided with the following: a situation detection unit that detects a situation of at least one of (i) the vehicle, (ii) an occupant, and (iii) a surrounding area; a history storage unit for sequentially storing the situation detected by the situation detection unit and whether or not an in-vehicle unit is operated when the situation is detected, as history data; a computational expression storage unit for storing a computational expression for obtaining a piece of comparison data from (i) recentness of the history data to be compared and (ii) a degree of similarity with the situation detected by the situation detection unit; a history selection unit that reads the computational expression stored in the computational expression storage unit, obtains comparison data using the read computational expression with respect to each piece of history data stored in the history storage unit, and selects one piece of history data using the obtained comparison data; and an in-vehicle unit control unit that controls an operation of an in-vehicle unit to agree with whether or not the in-vehicle unit is operated, described in the history data selected by the history selection unit.

As mentioned above, history data that indicates a similar situation and is recent is selected from among the history data stored in the history storage unit using a predetermined computational expression. By making the operation of an in-vehicle unit agree with whether or not the in-vehicle unit is operated, described in the selected history data, the in-vehicle unit can be controlled in accordance with relatively recent operation needs based on the driver' action in the past. A possible example of the predetermined computational expression is a computational expression for weighting both of two variables for degree of similarity and for recentness. For the weighting coefficient, a constant may be given as a predetermined value, or it may be updated by learning using as the teacher signal whether or not the operation of an in-vehicle unit is permitted by the driver.

According to another aspect of the present invention, a control device for controlling in-vehicle units in a vehicle is provided with the following: a driver attribute storage unit for storing an attribute of a driver of the vehicle; a situation detection unit that detects a situation of at least one of (i) the vehicle, (ii) an occupant, and (iii) a surrounding area; an in-vehicle unit operation model storage unit for storing, with respect to each in-vehicle unit of the in-vehicle units, a model that represents association between a variable indicating the attribute, a variable indicating the situation, and a variable indicating presence or absence of operation needs for the each in-vehicle unit as an in-vehicle unit operation model; an inference execution unit that sets (i) the attribute read from the driver attribute storage unit for the variable indicating the attribute in the in-vehicle unit operation model with respect to the each in-vehicle unit read from the in-vehicle unit operation model storage unit and (ii) the situation detected by the situation detection unit for the variable indicating the situation in the in-vehicle unit operation model with respect to the each in-vehicle unit read from the in-vehicle unit operation model storage unit, and determines presence or absence of operation needs for the each in-vehicle unit; an in-vehicle unit control unit that controls an operation of the each in-vehicle unit based on a result of determining by the inference execution unit; an operation detection unit that detects an operation of the each in-vehicle unit; and a model learning unit that learns the in-vehicle unit operation model stored in the in-vehicle unit operation model storage unit by using (i) the attribute read from the driver attribute storage unit, (ii) a situation detected by the situation detection unit when the operation of the each in-vehicle unit is detected by the operation detection unit, and (iii) an event involving the presence of operation needs for the each in-vehicle unit.

Thus, it is possible to add a variable indicating the situation not contained in an in-vehicle unit operation model at the beginning, and update the model and make it more suitable for the driver. In addition, a variable indicating the attributes of the driver is included in an in-vehicle unit operation model, and inference is carried out and a model is learned using the attributes of the driver. Therefore, it is possible to carry out elaborate in-vehicle unit control in accordance with the attributes of the driver. Examples of the "attribute of the driver" include the driver's age, sex, visual acuity, years of driving experience, personality, taste, and the like.

Inference and learning may be carried out using history information or a model related to another driver whose degree of similarity with the relevant driver is at a certain level or higher. Aside from driver attributes, a situation or history information may be used to measure the degree of similarity with the driver.

According to another aspect of the present invention, a method for controlling in-vehicle units in a vehicle is provided as follows. The method uses an in-vehicle unit operation model storage unit for storing, with respect to each in-vehicle unit, a model that represents association between a variable indicating a situation of at least one of the vehicle, an occupant, and a surrounding area and a variable indicating presence or absence of operation needs for the each in-vehicle unit as an in-vehicle unit operation model. The method includes the following: a situation detection step of detecting the situation; an inference execution step of setting the situation detected at the situation detection step for the variable indicating the situation in the in-vehicle unit operation model read from the in-vehicle unit operation model storage unit and determining presence or absence of operation needs for the each in-vehicle unit; an in-vehicle unit control step of controlling an operation of the each in-vehicle unit based on a result determined at the inference execution step; an operation detection step of detecting an operation of the each in-vehicle unit; and a model learning step of learning the in-vehicle unit operation model stored in the in-vehicle unit operation model storage unit using (i) the situation detected when the operation of the each in-vehicle unit is detected at the operation detection step and (ii) an event involving the presence of operation needs for the in-vehicle unit, to thereby update the in-vehicle unit operation model.

Thus, the chance to learn the in-vehicle unit operation model is dramatically increased as with a control device as an aspect of the present invention. Further, it is possible to add a variable indicting a situation not contained in an in-vehicle unit operation model at the beginning, and update the model and make it more suitable for the driver. It is also possible to apply the above-mentioned various constructions of the control device to the in-vehicle unit control method.

According to another aspect of the present invention, a computer program product in a computer-readable medium for use in controlling in-vehicle units in a vehicle is provided as follows. The product includes the following: (a) instructions for assigning an in-vehicle unit operation model storage area for storing, with respect to each in-vehicle unit, a model that represents association between a variable indicating a situation of at least one of the vehicle, an occupant, and a surrounding area and a variable indicating presence or absence of operation needs for the each in-vehicle unit as an in-vehicle unit operation model; (b) instructions for detecting the situation; (c) instructions for setting a situation detected at the situation detection instruction for the variable indicating the situation in the in-vehicle unit operation model read from the in-vehicle unit operation model storage area and determining presence or absence of operation needs for the each in-vehicle unit; (d) instructions for controlling an operation of the each in-vehicle unit based on a result determined at instructions (c); (e) instructions for detecting an operation of the each in-vehicle unit; and (f instructions for learning the in-vehicle unit operation model stored in the in-vehicle unit operation model storage area using (i) the situation detected when the operation of the each in-vehicle unit is detected at instructions (e) and (ii) an event involving the presence of operation needs for the in-vehicle unit, to thereby update the in-vehicle unit operation model.

Thus, the chance to learn the in-vehicle unit operation model is dramatically increased as with a control device as an aspect of the present invention. Further, it is possible to add a variable indicting a situation not contained in an in-vehicle unit operation model at the beginning, and update the model and make it more suitable for the driver. It is also possible to apply the above-mentioned various constructions of the control device to the computer program product.

BRIEF DESCRIPTION OF THE DRAWINGS

The above and other objects, features, and advantages of the present invention will become more apparent from the following detailed description made with reference to the accompanying drawings. In the drawings:

FIG. 8A is a diagram indicating the frequency of occurrence of a situation in which an in-vehicle unit is operated according to the first embodiment;

FIG. 8B is a default diagram indicating the frequency of occurrence of a situation according to the first embodiment;

FIG. 9A is a diagram indicating the frequency of occurrence of a situation, updated using an operating history according to the first embodiment;

FIG. 9B is a diagram indicating CPT obtained by normalizing the diagram updated using the operating history according to the first embodiment;

FIG. 13 is a drawing illustrating an example of an operating history according to the second embodiment;

DETAILED DESCRIPTION OF THE PREFERRED EMBODIMENTS

First Embodiment

Figure 1:
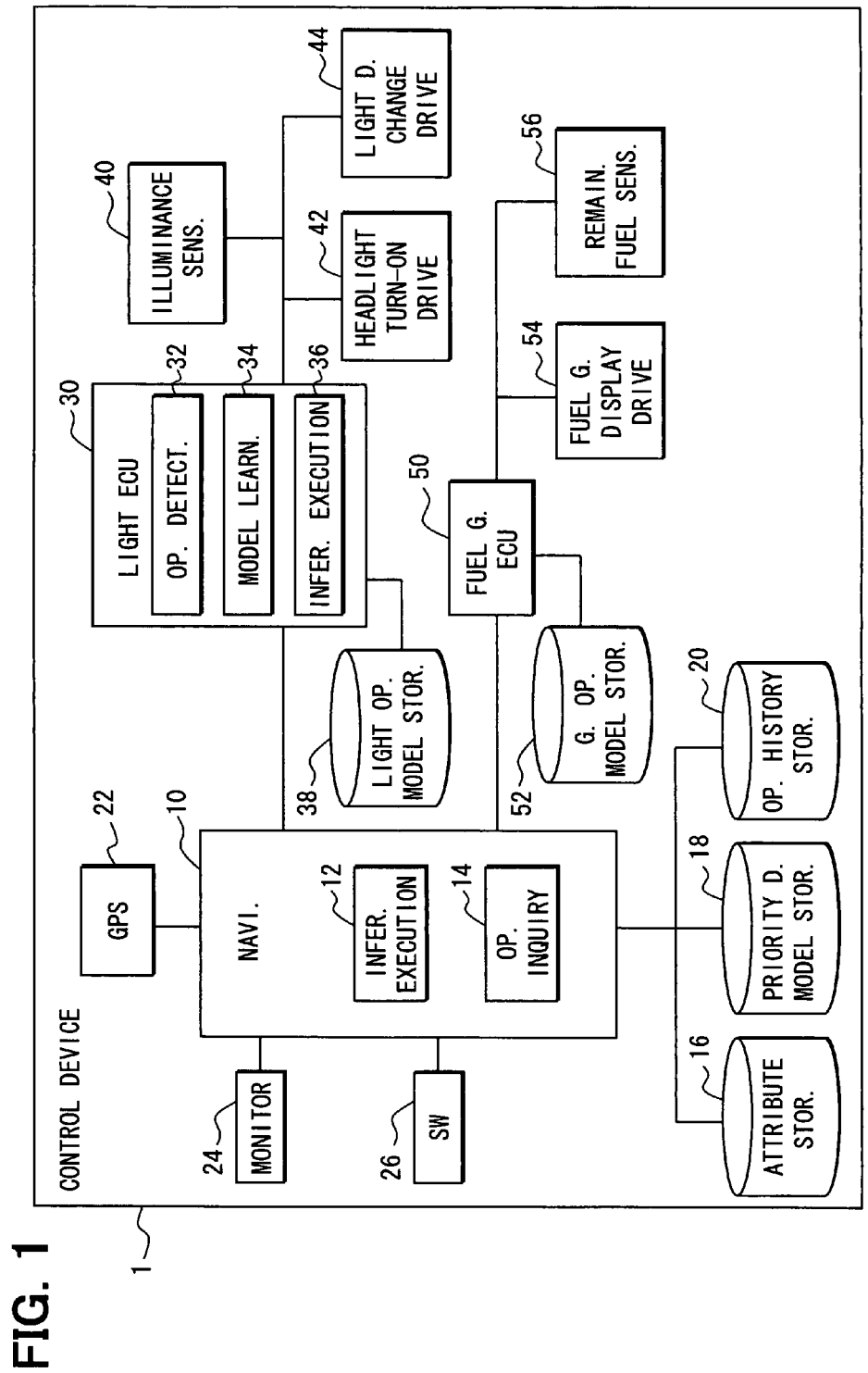
FIG. 1 is a drawing illustrating the configuration of a control device according to a first embodiment of the present invention.

FIG. 1 is a drawing illustrating the configuration of a control device 1 that controls in-vehicle units mounted in a vehicle, in this embodiment. In this embodiment, as illustrated in FIG. 1, the vehicle includes an illuminance sensor 40, a headlight turn-on drive unit 42, and a light direction change drive unit 44. The illuminance sensor 40 detects the lightness of exterior and is installed on, for example, top of the vehicle. These in-vehicle units related to lights are all connected to a light ECU (Electronic Control Unit) 30 and controlled by the light ECU 30.

The light ECU 30 includes an operation detection unit 32, a model learning unit 34, and an inference execution unit 36. The operation detection unit 32 has a function of detecting the operations of the in-vehicle units controlled by the light ECU 30. An example will be taken. When the headlights are turned on by the headlight turn-on drive unit 42, the operation detection unit 32 detects that the headlights have been turned on. The model learning unit 34 has a function of learning a light operation model, described later, using the situation in which operation was detected by the operation detection unit 32. The inference execution unit 36 has a function of determining the presence or absence of operation needs for the headlight turn-on drive unit 42 and the light direction change drive unit 44 from the situation detected by a situation detection unit, such as the illuminance sensor 40, by probabilistic inference.

The light ECU 30 is connected with a light operation model storage unit 38. A light operation model stored in the light operation model storage unit 38 is for determining whether or not there are needs for turning on a light. The light ECU 30 also has a model for determining whether or not there are needs for operating the light direction change drive unit 44 to change the direction of a light though it is not shown in the drawing.

Figure 2:
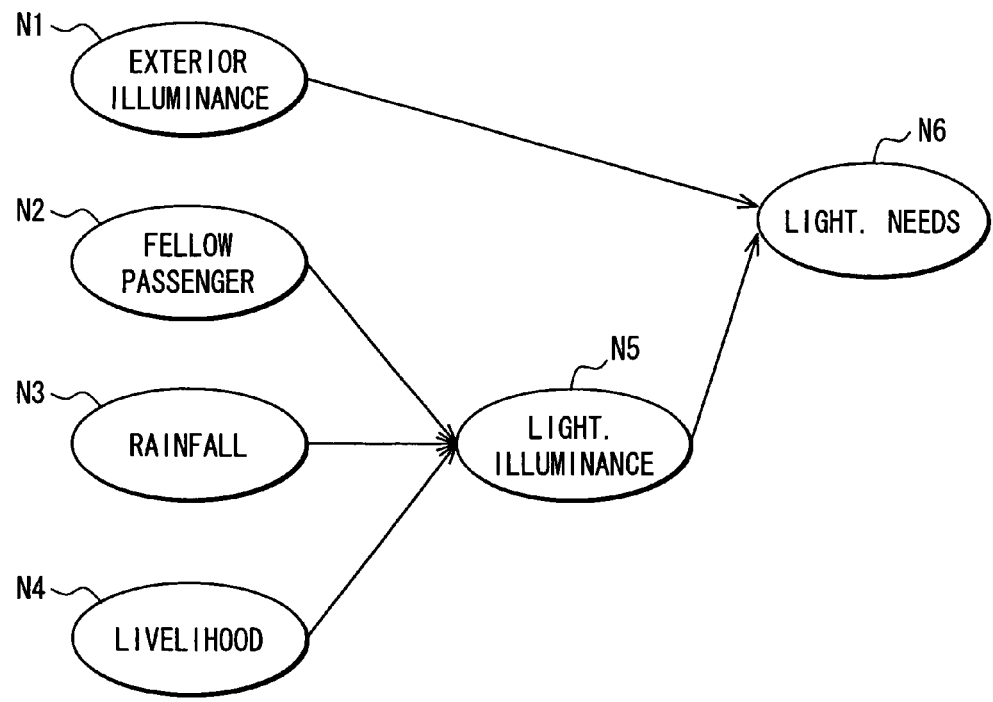
FIG. 2 is a drawing illustrating an example of an in-vehicle unit operation model according to the first embodiment.

FIG. 2 is a drawing illustrating an example of a light operation model. The light operation model includes: an exterior illuminance node N1 indicating the illuminance of the exterior; a fellow passenger node N2 indicating the presence or absence of a fellow passenger; an amount of rainfall node N3 indicating an amount of rainfall; and a livelihood sphere node N4 indicating whether or not the present position is in a livelihood sphere. The fellow passenger node N2, amount of rainfall node N3, and livelihood sphere node N4 are connected to a lighting illuminance node N5 indicating a lighting illuminance that refers to an illuminance at which a light should be turned on. This model indicates that the lighting illuminance depends on variables indicating the presence or absence of a fellow passenger, an amount of rainfall, and whether or not the present position is in a livelihood sphere. The lighting illuminance node N5 and the exterior illuminance node N1 are connected to a node N6 for lighting needs. This model indicates that lighting needs depend on lighting illuminance and exterior illuminance.

The light ECU 30 determines whether or not there are lighting needs for a light using a light operation model. The computation for determining the presence or absence of lighting needs is carried out as follows. The illuminance detected by the illuminance sensor 40 is set for the exterior illuminance node N1. Similarly, a value is set for the fellow passenger node N2, amount of rainfall node N3, and livelihood sphere node N4 by the driver's operation or using output from a publicly known sensor, not shown. A value for the lighting needs N6 is inferred from the values for the exterior illuminance node N1, fellow passenger node N2, amount of rainfall node N3, and livelihood sphere node N4 by probabilistic inference. When the result of this inference exceeds a predetermined threshold value, the light ECU 30 determines that there are lighting needs. The fellow passenger node N2, amount of rainfall node N3, or livelihood sphere node N4 is not a variable that varies in a short time. Therefore, the following procedure may be taken: a value for the lighting illuminance node N5 is determined beforehand from the values for the fellow passenger node N2, amount of rainfall node N3, and livelihood sphere node N4; and during a certain period, probabilistic inference is carried out using the exterior illuminance node N1 and the lighting illuminance node N5. Thus, a value for the node N5 for lighting illuminance need not be computed each time, and the load of computation processing can be lessened. The description of this embodiment takes as an example a case where the presence or absence of operation needs is determined by a model of Bayesian network. Instead, any other method, such as Gaussian function and SoftMax function, may be used to compute operation needs.

Further, the vehicle includes in-vehicle units constructed of a fuel gauge display drive unit 54 and a remaining fuel sensor 56, related to fuel. The in-vehicle units related to fuel are connected to a fuel gauge ECU 50 and controlled by the fuel gauge ECU 50. Similarly with the light ECU 30, the fuel gauge ECU 50 also includes an operation detection unit, a model learning unit, and an inference execution unit though they are not shown in FIG. 1.

The fuel gauge ECU 50 is connected with a fuel gauge operation model storage unit 52. A fuel gauge operation model stored in the fuel gauge operation model storage unit 52 is for determining whether or not there are needs for fueling. The fuel gauge operation model can be variously constructed. For example, it can be constructed as a model that represents the dependence between nodes for remaining fuel, fuel economy, distance to a destination, and the like and needs for fueling.

FIG. 1 depicts the headlight turn-on drive unit 42, light direction change drive unit 44, illuminance sensor 40, fuel gauge display drive unit 54, and remaining fuel sensor 56 as in-vehicle units. The in-vehicle units that can be controlled according to the invention are not limited to those illustrated in FIG. 1. The vehicle may be mounted with a wide variety of in-vehicle units and sensors. For example, the in-vehicle units and sensors described below can be used in the invention.

Figure 3:
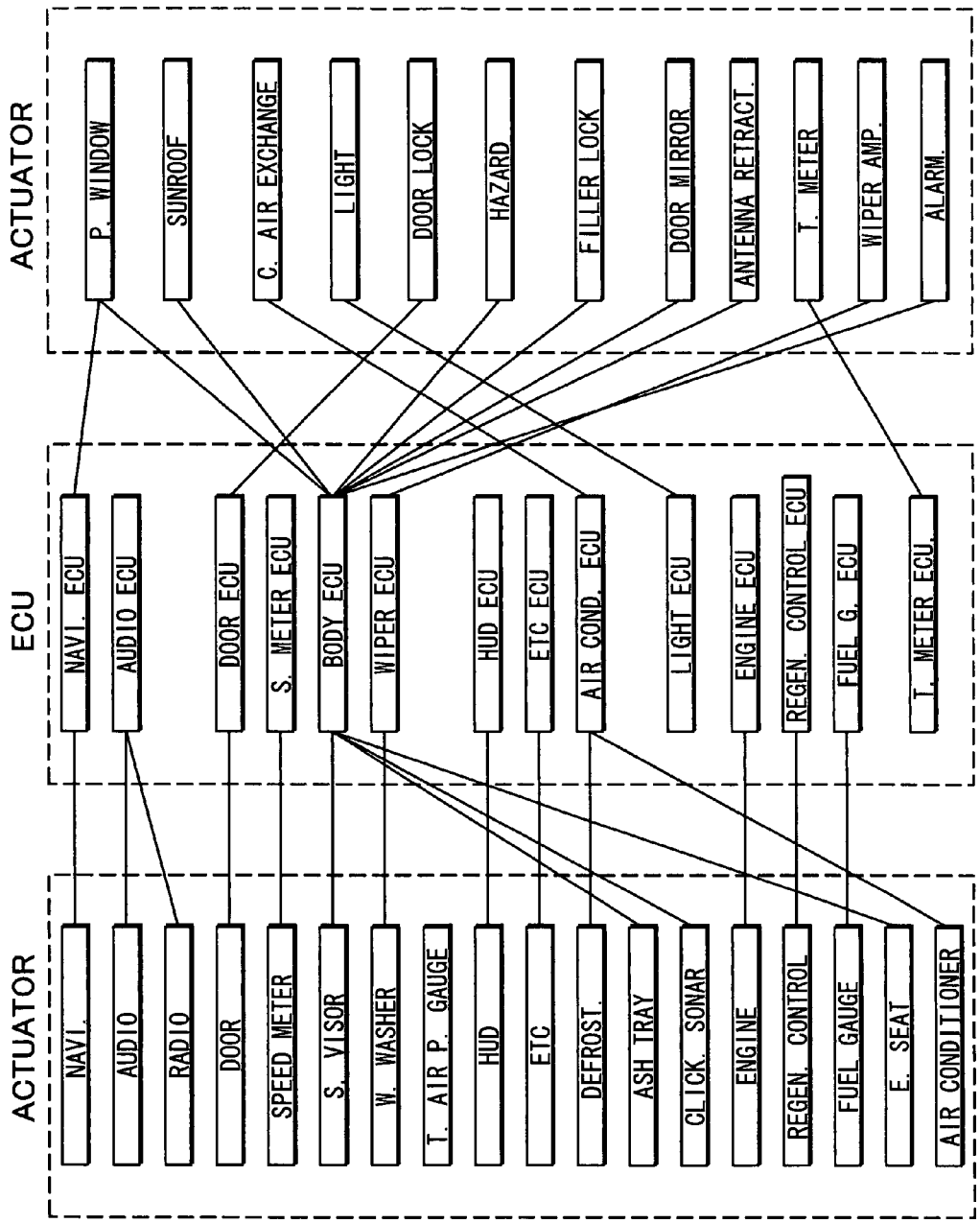
FIG. 3 is a drawing illustrating actuators and ECUs according to the first embodiment.

FIG. 3 illustrates actuators and ECUs that can be used in the invention. These actuators include a car navigation system, audio, radio, door, speed meter, auto sun visor, wiper washer, tire air pressure gauge, head-up display (HUD), ETC, defroster, ash tray, clickable sonar, engine, regenerative control, fuel gauge, electric seat, air conditioner, power window actuator, sunroof actuator, conditioner air exchange actuator, light, door lock actuator, hazard, filler lock actuator, door mirror, antenna retraction actuator, trip meter, wiper amplifier, and alarm. The ECUs include a navigation ECU, audio ECU, door ECU, speed meter ECU, body ECU, wiper ECU, HUD ECU, ETC ECU, air conditioner ECU, light ECU, engine ECU, regenerative control ECU, fuel gauge ECU, and trip meter ECU. Information on the situation obtained from a surrounding observation sensor, a camera, a microphone, a recognition sensor, a seat sensor, an invasion sensor, or the like can be used in the invention though they are not shown in the drawing. The above is the description of various actuators, ECUs, and sensors; however, the invention is not limited to those described here as examples.

The control device 1 includes an automobile navigation system 10 having the functions of a center ECU, a monitor 24, and a switch 26. The monitor 24 may be part of the automobile navigation system 10 or may be constructed as a separate device. The monitor 24 has functions of displaying route information and the like retrieved by the automobile navigation system 10 and presenting the operation of an in-vehicle unit based on the result of inference by the control device 1.

The automobile navigation system 10 includes an inference execution unit 12 and an operation inquiry unit 14. The inference execution unit 12 has a function of performing the following operation: when operation needs for multiple units are notified from various ECUs, such as the light ECU 30 and the fuel gauge ECU 50, it infers operation needs for which unit should be prioritized. The inference execution unit 12 determines the priorities of the operations of in-vehicle units using a priority determination model stored in a priority determination model storage unit 18 connected with the automobile navigation system 10. A priority determination model is for determining an in-vehicle unit that should be preferentially operated when it is determined that there are operation needs for multiple in-vehicle units.

Figure 4:
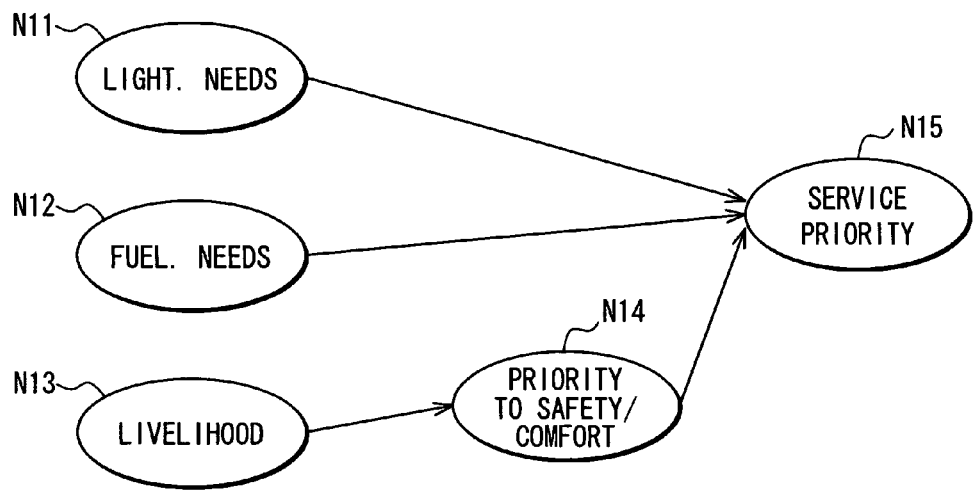
FIG. 4 is a drawing illustrating an example of a priority determination model according to the first embodiment.

FIG. 4 illustrates an example of a priority determination model. The priority determination model includes: a lighting needs node N11 indicating the presence or absence of lighting needs; a fueling needs node N12 indicating the presence or absence of needs for fueling; and a livelihood sphere node N13 indicating whether or not the present position is in a livelihood sphere. The livelihood sphere node N13 is connected with a node N14 indicating whether priority is given to safety or to comfort. The lighting needs node N11, fueling needs node N12, and node N14 for indicating whether priority is given to safety or to comfort are all connected to a service priority node N15 indicating service priority. When there are operation needs for multiple in-vehicle units, the automobile navigation system 10 determines the priority of operation needs for each in-vehicle unit using this priority determination model. The description here also takes as an example a case where priorities are determined by a model of Bayesian network. Instead, any other method, such as Gaussian function and SoftMax function, may be used to compute priorities.

The operation inquiry unit 14 of the automobile navigation system 10 has a function of inquiring of the driver whether or not an in-vehicle unit may be operated. The operation inquiry unit 14 displays on the monitor 24 a message inquiring whether or not an in-vehicle unit, for which it is determined that there are operation needs, may be operated. For example, it displays a message of "Turn on headlights?" on the monitor 24. When a message inquiring whether or not an in-vehicle unit may be operated is displayed, a reason why the operation of that in-vehicle unit is recommended may be displayed together. The reason why the operation of an in-vehicle unit is recommended can be determined by finding a node that contributes most to operation needs for the in-vehicle unit in inference using an in-vehicle unit operation model.

The operation inquiry unit 14 has a function of receiving permission for or rejection to the operation of an in-vehicle unit, presented on the monitor 24, from the driver through the switch 26. The switch 26 may be installed on the steering wheel so that the driver can easily operate it. An example of the switch 26 is "YES" and "NO" buttons. Whether an operation is permitted or rejected is confirmed by the selection of the "YES" button or the "NO" button. As another example, the following construction may be adopted: only the "YES"

button is provided as the switch 26; and whether an operation is permitted or rejected is confirmed according to whether the "YES" button is operated or the "YES" button has not been operated for a predetermined time.

The description of this embodiment takes as an example a case where an operation inquiry is made using the monitor 24 and the switch 26. Instead, some other user interface may be adopted. For example, an inquiring message of "Are you going to turn on the headlights?" or the like is outputted from a speaker. The speech of "Yes" or "No" given out by the driver is analyzed by a speech recognition unit to accept input of permission for or rejection to the operation. With this construction, the driver can respond to an inquiry about operation without viewing the monitor 24, and this does not hinder driving.

The control device 1 includes a driver attribute storage unit 16 for storing an attribute of the driver and an operating history storage unit 20 for storing the operating histories of in-vehicle units. The attributes of a driver include information on the driver's age, sex, visual acuity, personality, and the like. When there are multiple drivers who operate the vehicle, the attributes of each driver are stored. In this case, the invention can be so constructed that the following is implemented to identify the current driver: the driver inputs information identifying his/her through a touch panel or the like before starting the vehicle, or the driver is presumed from his/her driving habit. When each driver possesses a different electronic key, the current driver may be identified from the electronic key inserted into the vehicle.

The operating history storage unit 20 has a function of storing the operating history of each in-vehicle unit. When it is detected that an in-vehicle unit has been operated, in the control device 1, the detection information is notified from each ECU to the automobile navigation system 10. In response to the detection of the operation of the in-vehicle unit, the automobile navigation system 10 acquires the situation at that point of time from various sensors. The automobile navigation system 10 stores the in-vehicle unit whose operation was detected, the time of operation, and the situation at that point of time in the operating history storage unit 20 in association (i.e., correspondence) with one another.

Figure 5:
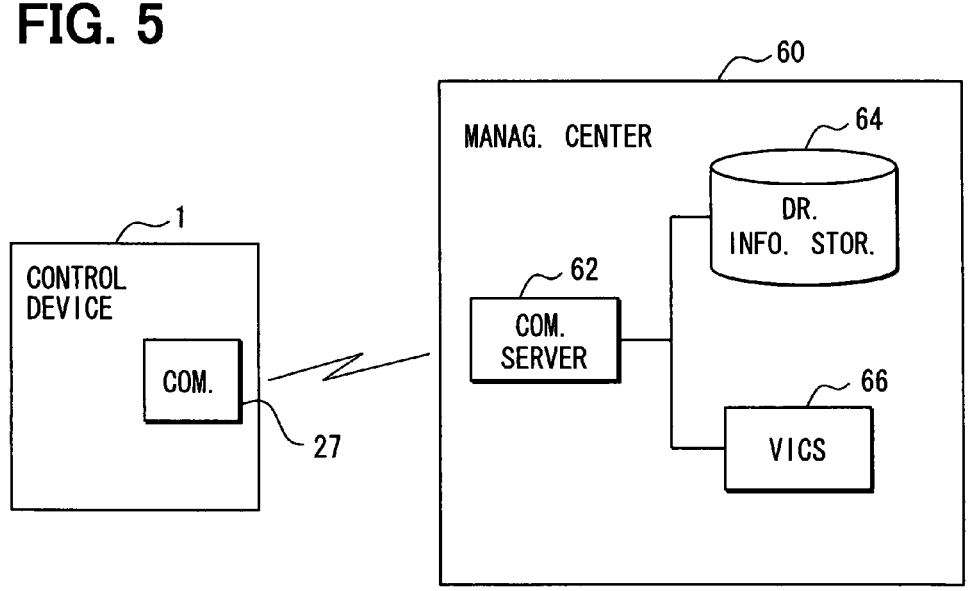
FIG. 5 is a drawing illustrating the configuration of a control device and a management center according to the first embodiment.

FIG. 5 illustrates a control device 1 and a management center 60. The management center 60 is connected to a communication unit 27 of the control device 1 through a network, and communicates with the communication unit 27 of the control device 1 through a communications server 62. The management center 60 includes a driver information storage unit 64 and VICS (Vehicle Information and Communication System) 66.

The driver information storage unit 64 stores information on the attributes of individual drivers, operating histories, and the like transmitted from multiple control devices 1. For instance, by clustering operating histories with respect of each attribute of drivers, an in-vehicle unit operation model can be generated with respect to each attribute of drivers (i.e., multiple attribute-specific in-vehicle unit operation models can be generated). Thus, it is possible to provide with a driver who uses the control device 1 for the first time with an in-vehicle unit operation model suited to the attributes of the driver.

The VICS 66 transmits traffic information about traffic jam, traffic restriction, and the like in real time. When traffic information is transmitted from the VICS 66 of the management center 60 to the control device 1, the control device 1 can detect the traffic information to control in-vehicle units.

Figures 6, 7A, 7B:
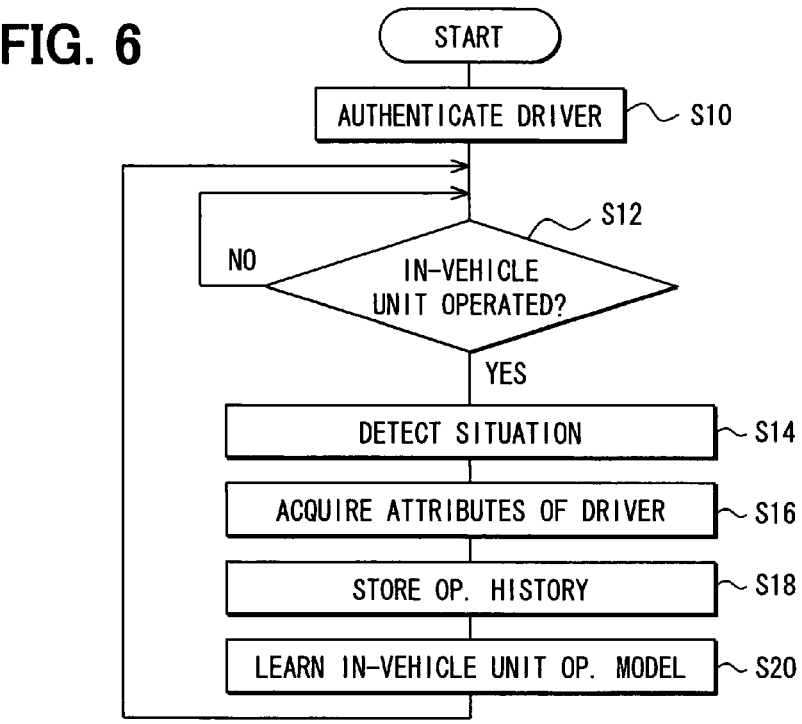
FIG. 6 is a chart illustrating the steps in learning processing carried out in a control device according to the first embodiment.
FIG. 7A is a drawing illustrating an example of data stored in an operating history storage unit according to the first embodiment.
FIG. 7B is a drawing illustrating data obtained by binarizing the data of the amount of rainfall in the example of the data stored in the operating history storage unit according to the first embodiment.

Description will be given to the operation of the control device 1. FIG. 6 is a chart illustrating the steps in the operation to learn an in-vehicle unit operation model carried out by the control device 1. The control device 1 learns a model while the vehicle is running. First, the control device 1 authenticates the driver who operates the vehicle (S10). Examples of methods for authenticating a driver include a method using an electronic key and biometric identification using fingerprint or iris. This makes it possible to prevent theft and identify the driver who operates the vehicle.

After the vehicle is started, the control device 1 determines whether or not any in-vehicle unit has been operated (S12). This processing is repeatedly carried out until the operation of any in-vehicle unit is detected. When the operation of any in-vehicle unit is detected (YES at S12), the control device 1 proceeds to the next step.

When the operation of an in-vehicle unit is detected, the control device 1 detects the situation at that point of time (S14). When it is detected that the headlights have been turned on, for example, the control device detects the illuminance of exterior at that point of time through the exterior illuminance sensor 40. Then, the control device 1 acquires attributes of the driver (S16). Thereafter, the control device 1 stores the operating history of the in-vehicle unit in correspondence with the detected situation and the attributes of the driver (S18).

Using the stored operating history, the control device 1 leans a light operation model (in-vehicle unit operation model) (S20). In the example illustrated in FIG. 6, an in-vehicle unit operation model is learned (S20) immediately after the operating history is stored (S18). However, it is unnecessary to learn an in-vehicle unit operation model each time a new operating history is added. Instead, an in-vehicle unit operation model may be learned when a predetermined amount of operating histories is accumulated. However, when the frequency of learning a model is high, an in-vehicle unit operation model can be swiftly updated to one more suitable for the driver.

Detailed description will be given to leaning of a model with a light operation model taken as an example. FIG. 7A illustrates an example of an operating history obtained when the turn-on of a light is detected. As illustrated in FIG. 7A, pieces of data respectively indicating "fellow passenger," "livelihood sphere," "amount of rainfall," and "lighting illuminance" are stored as an operating history. The "fellow passenger" is data indicating whether or not a fellow passenger was present when the light was turned on. The "livelihood sphere" is data indicating whether or not the area where the vehicle was running when the light was turned on is a livelihood sphere. Whether an area is a livelihood sphere can be determined, for example, by the following procedure: the place where the vehicle is running is checked by the automobile navigation system 10; when the place is located in proximity to the driver's home or place of work, the place is determined to be a livelihood sphere. The "amount of rainfall" is data indicating an amount of rainfall detected when the light was turned on. This data is obtained by determining the amount of rainfall according to the level of operation of the wiper or measuring the amount of raindrops hitting the roof of the vehicle with a sensor. The "lighting illuminance" is data indicating the lightness of exterior detected when the light was turned on. This data is obtained by the above-mentioned illuminance sensor 40.

The data illustrated in FIG. 7B is obtained by binarizing the data of amount of rainfall in the operating history illustrated in FIG. 7A. This binarization is carried out by making the "TRUE" judgment when the amount of rainfall is not less than "3" and the "FALSE" judgment when it is not more than "2." By binarizing data of amount of rainfall, as mentioned above, the load of subsequent computation processing can be lessened. Binarization of amount of rainfall is not indispensable. When the light ECU 30 has a high computational capacity, binarization need not be carried out.

In this embodiment, the learning of the light operation model illustrated in FIG. 2 is carried out using the data of the operating history illustrated in FIG. 7B. In the light operation model illustrated in FIG. 2, the nodes are connected with one another through a directed link that represents the dependence indicating conditional probability. In this embodiment, a model is learned by updating this dependence (Conditional Probability Table: hereafter, referred to as "CPT") based on an operating history. To carry out learning, the frequency of occurrence of each situation detected when turn-on of the light is detected is computed from the data illustrated in FIG. 7B.

FIG. 8A is a diagram obtained by aggregating the frequencies of occurrence of the situations of "the presence or absence of a fellow passenger," "whether or not the present position is in a livelihood sphere," "the presence or absence of rainfall," and "lighting illuminance" detected when the light was turned on, from the operating history data illustrated in FIG. 7B. The following are understood by referring to the eighth row on the third column in the diagram illustrated in FIG. 8A: the light was turned on once under the conditions of "fellow passenger present," "livelihood sphere TRUE," "no rainfall," and "lighting illuminance 8." This description takes as an example a case where the frequency of occurrence of each situation detected when the light was turned on is simply counted with respect to the operating history data illustrated in FIG. 7B. Instead, a frequency of occurrence may be set with respect to deeply correlated situations for the acceleration of learning. For example, a numeric value of 0.5 or the like is set for the frequency of occurrence in the field of "fellow passenger present," "livelihood sphere TRUE," "no rainfall," and "lighting illuminance 7."

FIG. 8B is a diagram indicating the frequency of occurrence of each situation detected when the light is turned on, in a default light operation model. In this diagram, the frequency of occurrence of each situation detected when the light is turned on is all "1," and there is not any bias in the situations. That is, the diagram illustrated in FIG. 8B defines nothing with respect to in what situation the light is turned on.

The light ECU 30 adds the frequencies of occurrence obtained based on the operating history illustrated in FIG. 8A to the default diagram illustrated in FIG. 8B to generate the diagram illustrated in FIG. 9A. The reason why addition is made to the default frequencies illustrated in FIG. 8B, as mentioned above, is to prevent the conditional probability in a specific situation from becoming excessively high in the initial stage of learning when the number of pieces of data is small. In this embodiment, the default diagram of frequencies defines that the frequencies with which the operation of turning on the light is performed are equal in all the situations (Refer to FIG. 8B). In case of turn-on of a light, for example, it is expected that the probability that the light is turned on is high when the illuminance of exterior is low. In such a case, this trend may be incorporated in a default diagram of frequencies.

Next, the light ECU 30 normalizes the generated diagram of frequencies to generate such a CPT as illustrated in FIG. 9B. The light operation model can be learned using the operating history with respect to the driver by the above-mentioned processing.

Figure 10:
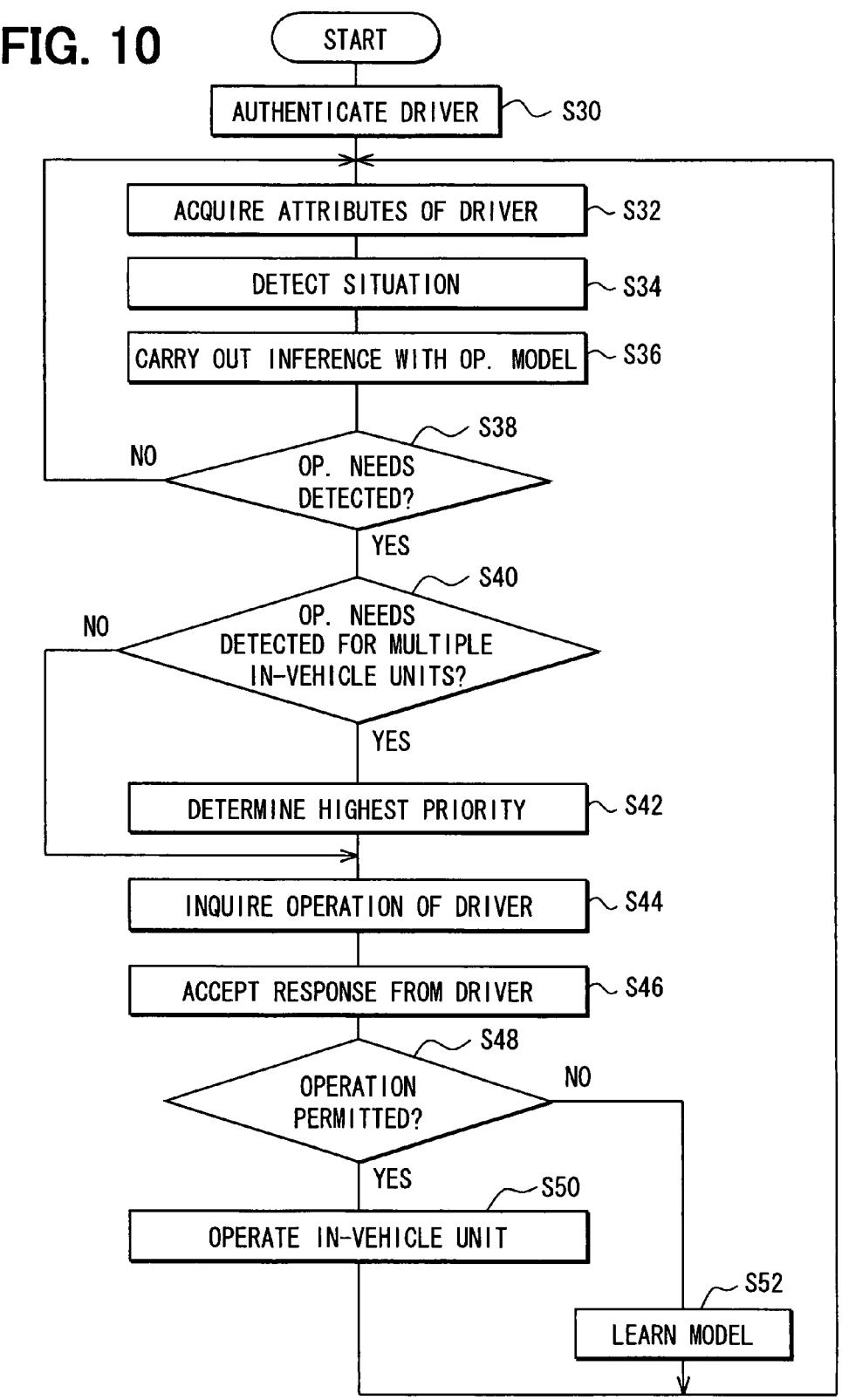
FIG. 10 is a chart illustrating the steps in the control of an in-vehicle unit by a control device according to the first embodiment.

FIG. 10 is a chart illustrating the steps in the operation of controlling an in-vehicle unit by the control device 1. When the driver attempts to start the operation of the vehicle, the control device 1 authenticates the driver (S30). When each driver possesses a different electronic key, for example, the current driver may be identified from the electronic key inserted into the vehicle.

Next, using the information on the driver identified at the first step (S30), the control device 1 acquires a driver attribute from the driver attribute storage unit 16 (S32).

When the driver starts operation, various sensors equipped in the vehicle detect the situation (S34). For example, the illuminance sensor 40 detects the illuminance (lightness) of exterior. The automobile navigation system 10 locates the present position and determines whether or not the area where the vehicle is now running is a livelihood sphere. The remaining fuel sensor 56 detects the remaining quantity of fuel. A temperature sensor, not shown, detects the temperature in the vehicle compartment. Aside from those described here as example, various sensors of the vehicle detect the situation of the vehicle or the situation of the area surrounding the vehicle.

Subsequently, each ECU (e.g., the light ECU 30, the fuel gauge ECU 50) of the control device 1 sets the acquired driver attribute and information on the situation for the in-vehicle unit operation model. Then, each ECU carries out probabilistic inference to determine the presence or absence of operation needs for the corresponding in-vehicle unit (S36). When the presence or absence of needs for turning on a light, for example, the following processing is carried out: the exterior illuminance detected by the illuminance sensor 40 is set for the exterior illuminance node N1 in the light turn-on model illustrated in FIG. 2; the presence or absence of a fellow passenger is set for the fellow passenger node N2; the presence or absence of rainfall is set for the amount of rainfall node N3; and a value indicating whether or not the present position is in a livelihood sphere is set for the livelihood sphere node N4. Then, using such a CPT as illustrated in FIG. 9B, the light ECU 30 determines the conditional probability for the lighting illuminance node N5 from the fellow passenger node N2, amount of rainfall node N3, and livelihood sphere node N4. Subsequently, the light ECU 30 determines the presence or absence of lighting needs based on the determined value for the lighting illuminance node N5 and the determined value for the exterior illuminance node N1.

When the magnitude of operation needs for corresponding in-vehicle units exceeds a predetermined value, the ECUs, such as the light ECU 30 and the fuel gauge ECU 50, notify of the automobile navigation system 10 that operation needs have been detected. The automobile navigation system 10 of the control device 1 detects whether or not any ECU has detected operation needs for the corresponding in-vehicle unit (S38). When operation needs are not detected (NO at S38), the control device carries out the driver attribute information acquisition (S32), situation detection (S34), and inference execution (S36) to repeatedly try to detect operation needs. When only an attribute (age, sex, etc.) that does not change unless the driver changes is used for driver attribute information, driver attribute acquisition (S32) need not be carried out each time. In this case, it is desirable that the control device 1 should be so constructed that the following is implemented: it stores driver attribute information initially read in memory, and utilizes the driver attribute information stored in memory.

When operation needs are detected (YES at S38), the automobile navigation system 10 determines whether or not there are operation needs for multiple in-vehicle units (S40). When there are operation needs for multiple in-vehicle units (YES at S40), the automobile navigation system 10 determines the operation needs of the highest priority using a priority determination model (S42). When there are both lighting needs for light and fueling needs for fuel, the automobile navigation system determines service priority using the priority determination model illustrated in FIG. 4. The automobile navigation system 10 sets lighting needs notified from the light ECU 30 for the lighting needs node N11 and fueling needs notified from the fuel gauge ECU 50 for the fueling needs node N12. Further, a value indicating whether or not the present position is in a livelihood sphere, determined by the automobile navigation system 10, is set for the livelihood sphere node N13, and probabilistic inference is carried out.

When observed events required for carrying out probabilistic inference are insufficient, some other ECU may be requested to carry out inference. When the value for the livelihood sphere node N13 is unknown in the priority determination model illustrated in FIG. 4, for example, a value for the node N14 indicating whether priority is given to safety or to comfort may be computed at some other ECU. The construction that some other ECU is caused to carry out computation, mentioned above, is suitable especially when a value for a node related to driver attribute information is determined. Specifically, the control device is so constructed that the following is implemented: with respect to a value for a node related to driver attribute information, personal information is not stored in each ECU but inference is carried out at a specific ECU that manages personal information; and only the result of the inference is supplied to an appropriate ECU. Thus, the number of ECUs that manage driver attribute information can be reduced, and this contributes to the protection of personal information.

After the priorities of operation needs are determined or when there are not multiple operation needs (NO at S40), the automobile navigation system 10 makes inquiry about the operation of the in-vehicle unit (S44). Specifically, information indicating an in-vehicle unit for which there are high operation needs is displayed on the monitor 24 to confirm the driver's intention about its operation. When there are light lighting needs, for example, a message of "Turn on the headlights?" or the like is displayed, and input of a "YES" or "NO" response through the switch 26 is waited for. The mode of display may be varied. For example, the message may be displayed in large size or in small size according to the magnitude of operation needs or the factor of certainty of inference by which the presence of operation needs is determined.

It is desirable that a driver's intention about the operation of an in-vehicle unit should be confirmed when the driver has leeway. For example, if a driver's intention about whether to operate an in-vehicle unit is confirmed when he/she is about to turn to the left or right or make a lane change, that hinders driving and is dangerous. Therefore, it is desirable that the control device 1 should use information from the automobile navigation system 10 or the like to detect a time for which the vehicle will go straight for a while before displaying a message inquiring about the operation. Favorable timing for inquiry about operation is different from driver to driver. Therefore, the invention may be so constructed that the timing with which a message inquiring about operation is displayed is learned. For example, a situation in which a driver responded to inquiry about operation and a situation in which the driver did not respond are stored, and a message inquiring about operation is displayed when the probability that the driver responds is high.

Then, the control device 1 accepts a response from the driver (S46), and determines whether the operation of the in-vehicle unit was permitted or rejected (S48). In the above example, when the "YES" button is selected by the driver, it is determined that the operation of the in-vehicle unit has been permitted; when the "NO" button is selected, it is determined that the operation of the in-vehicle unit has been rejected. When it is determined that the operation of the in-vehicle unit has been permitted (YES at S48), the in-vehicle unit is operated (S50). In case of light lighting needs, for example, the headlights are actually turned on. In conjunction with the operation of the in-vehicle unit, at this time, it may be notified that the in-vehicle unit has been operated. When the headlights are turned on, for example, speech of "The headlights will be turned on." is given to the driver. Thus, the driver can get to know that the headlights have been turned on.

When it is determined that the operation of the in-vehicle unit is rejected (NO at S48), the control device 1 learns the in-vehicle unit operation model without operating the in-vehicle unit (S52). That the operation of an in-vehicle unit is rejected means that there were not operation needs in each situation on which the control device 1 determined that there were operation needs based. Therefore, the CPT is updated so that operation needs will not be determined to exist in the situation. This is done, for example, by reducing the frequency of occurrence of a situation in which the driver rejected operation in the diagram of frequencies illustrated in FIG. 9A.

The control device 1 returns to the step (S32) for reading driver attribute information and repeatedly carries out the above-mentioned processing when an in-vehicle unit is operated (S50) and when a model is learned without operating an in-vehicle unit (S52). Through the above processing, it is possible to detect operation needs for an in-vehicle unit according to change in the situation and assist the driver's operation of the in-vehicle unit.

The model learning processing illustrated in FIG. 6 and the in-vehicle unit control processing illustrated in FIG. 10 are carried out in parallel. An in-vehicle unit operation model is learned based on the operating history of an in-vehicle unit with respect to a driver and the in-vehicle unit operation model is made suitable for the driver, and further, the in-vehicle unit is controlled using this in-vehicle unit operation model.

When the operation of an in-vehicle unit is detected, for example, the turn-on of a light is detected by the operation detection unit 32 of the light ECU 30, the control device 1 stores the situation of the occupant, the vehicle, or the surrounding area at that time as an operating history. The model learning unit 34 learns the in-vehicle unit operation model using the operating history. Thus, when an in-vehicle unit is operated during operation the driver routinely performs, the situation in which operation needs for the in-vehicle unit occur can be learned. Therefore, the chance to learn the in-vehicle unit operation model is dramatically increased. As a result, an in-vehicle unit operation model for determining the presence or absence of operation needs for an in-vehicle unit can be swiftly tailored to the driver. Further, it is possible to flexibly cope with change in operation needs due to change of seasons, familiarization with peripheral road conditions, or the like.

A model that represents the dependence between multiple variables indicating the situation and operation needs for an in-vehicle unit is learned using an operating history obtained when the in-vehicle unit is operated. Therefore, it is possible to add a variable indicting a situation not contained in an in-vehicle unit operation model at the beginning, and update the model and make it more suitable for the driver. In the model illustrated in FIG. 2, the exterior illuminance, fellow passenger, amount of rainfall, and livelihood sphere nodes are defined as nodes for determining the presence of lighting needs. For example, when it is apparent from an operating history that there is correlation between the turn-on of headlights and traffic volume, the model can be updated to incorporate a node for traffic volume.

The control device 1 in this embodiment includes the driver attribute storage unit 16 and reads the attributes of an authenticated driver from the driver attribute storage unit 16. The control device 1 determines the presence or absence of operation needs using the read driver attributes; therefore, in-vehicle units can be controlled in accordance with the character of each driver.

The control device 1 in this embodiment is connected with the management center 60 through a network. Thus, the management center 60 can collect the operating histories of in-vehicle units from each control device 1 and generate an average in-vehicle unit operation model. The control device 1 can acquire an in-vehicle unit operation model generated at the management center 60. Therefore, when an in-vehicle unit operation model is used for the first time, in-vehicle units can be controlled conveniently to average drivers.

Second Embodiment

Description will be given to a control device in a second embodiment of the invention. The control device in the second embodiment and the control device 1 in the first embodiment are identical with each other in basic construction (Refer to FIG. 1). In addition to the construction of the control device 1 in the first embodiment in which the presence or absence of operation needs is determined with respect to each in-vehicle unit, the control device in the second embodiment has a construction for controlling multiple in-vehicle units that are often operated at the same time.

Figure 11A:
FIG. 11A is a drawing illustrating a GS operation template indicating the operations of in-vehicle units at a gas station according to a second embodiment.
Figure 11B:
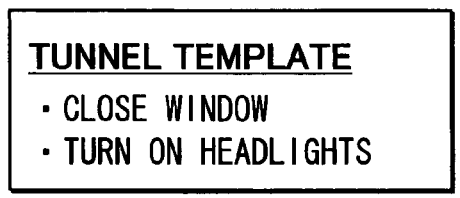
FIG. 11B is a drawing illustrating a tunnel run template indicating the operations of in-vehicle units performed when a vehicle runs in a tunnel according to the second embodiment.

FIG. 11A and FIG. 11B are drawings illustrating examples of service templates that define the operations of in-vehicle units that are often simultaneously performed in the control device in the second embodiment. The GS operation template illustrated in FIG. 11A defines the operations of in-vehicle units that are often simultaneously performed when the vehicle goes into a gas station (hereafter, abbreviated as "GS"). The tunnel run template illustrated in FIG. 11B defines the operations of in-vehicle units that are often simultaneously performed when the vehicle runs in a tunnel.

The control device in the second embodiment stores such service templates as illustrated in FIG. 11A and FIG. 11B, and thus it can appropriately control in-vehicle units according to the situation.

Figure 12:
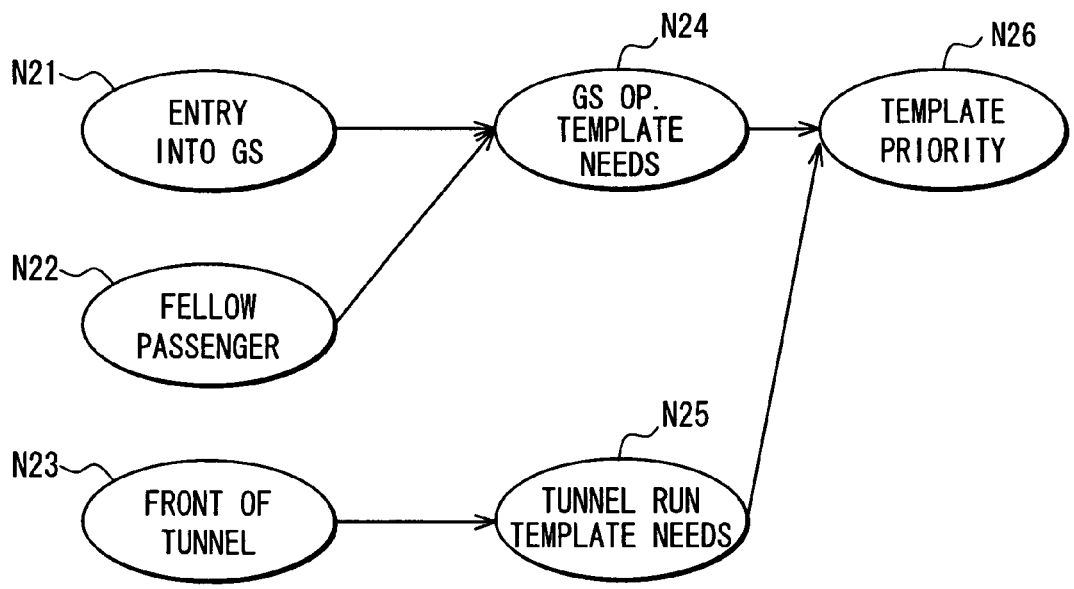
FIG. 12 is a drawing illustrating an example of a template execution needs determination model according to the second embodiment.

FIG. 12 illustrates an example of a model for determining the presence or absence of template execution needs, used in the control device in the second embodiment. This model also has a role in determining priorities when there are execution needs for multiple templates. In the template execution needs determination model, a node N21 indicating whether or not the vehicle has gone into GS and a node N22 indicating whether or not a fellow passenger is present are connected to a node N24 for GS operation template needs. Thus, the presence or absence of execution needs for the GS operation template can be determined based on whether or not the vehicle has gone into GS and whether or not a fellow passenger is present.

In addition, a node N23 indicating whether or not the present position is located immediately in front of a tunnel is connected to a node N25 for tunnel run template needs. Thus, the presence or absence of execution needs for the tunnel run template can be determined based on whether or not the present position is located immediately in front of a tunnel.

Further, the node N24 for GS operation template needs and the node N25 for tunnel run template needs are connected to a node N26 for template priority. Thus, the priorities of execution needs for the GS operation template and execution needs for the tunnel run template can be determined.

The control device in the second embodiment operates as follows when it detects the situation in which the vehicle has gone into GS or is positioned immediately in front of a tunnel and determines that there are execution needs for the GS operation template or the tunnel run template: the control device carries out the operations of the multiple in-vehicle units defined in the GS operation template or the tunnel run template. The situation in which the vehicle has gone into GS or is positioned immediately in front of a tunnel can be detected by locating the present position of the vehicle with GPS 22 and poring over a map of the area in proximity to the present position of the vehicle with the automobile navigation system 10.

Description will be given to a method for generating the templates illustrated in FIG. 11A and FIG. 11B. The control device detects the operations of in-vehicle units carried out in the same situation based on an operating history stored in the operating history storage unit 20.

FIG. 13 illustrates an example of data stored in the operating history storage unit 20. In the example illustrated in FIG. 13, data D1 and data D2 indicate that the wiper was turned off and the audio was turned off in a situation in which the vehicle went into GS. Therefore, it can be understood from this operating history that there is correlation between entry into GS, wiper turn-off, and audio turn-off. When the magnitude of this correlation exceeds a predetermined threshold value, a template can be defined as a series of operations in one service. When there is an execution sequence among the operations of multiple in-vehicle units that construct one service, that execution sequence may be learned together. For example, HMM (Hidden Markov Model) can be used for this learning.

In case of a driver who does not turn off the audio even when his/her vehicle goes into GS, the correlation between entry into GS and audio turn-off is weakened. Therefore, audio turn-off is not included in the template. Also, when the operation of turning off the audio is included in the GS operation template at the beginning, the operation of turning off the audio is excluded from the GS operation template on the following occasion: an occasion when it is revealed by the analysis of accumulated operating histories that the magnitude of correlation between entry into GS and audio turn-off is equal to or lower than a predetermined threshold value. A template can be updated and tailored to the driver by carrying out such learning.

The control device in the second embodiment defines the operations of multiple in-vehicle units that are often simultaneously carried out in a template, and operates multiple in-vehicle units on a template-by-template basis. Therefore, the operations of multiple in-vehicle units can be appropriately controlled according to the situation.

Third Embodiment

Figure 14:
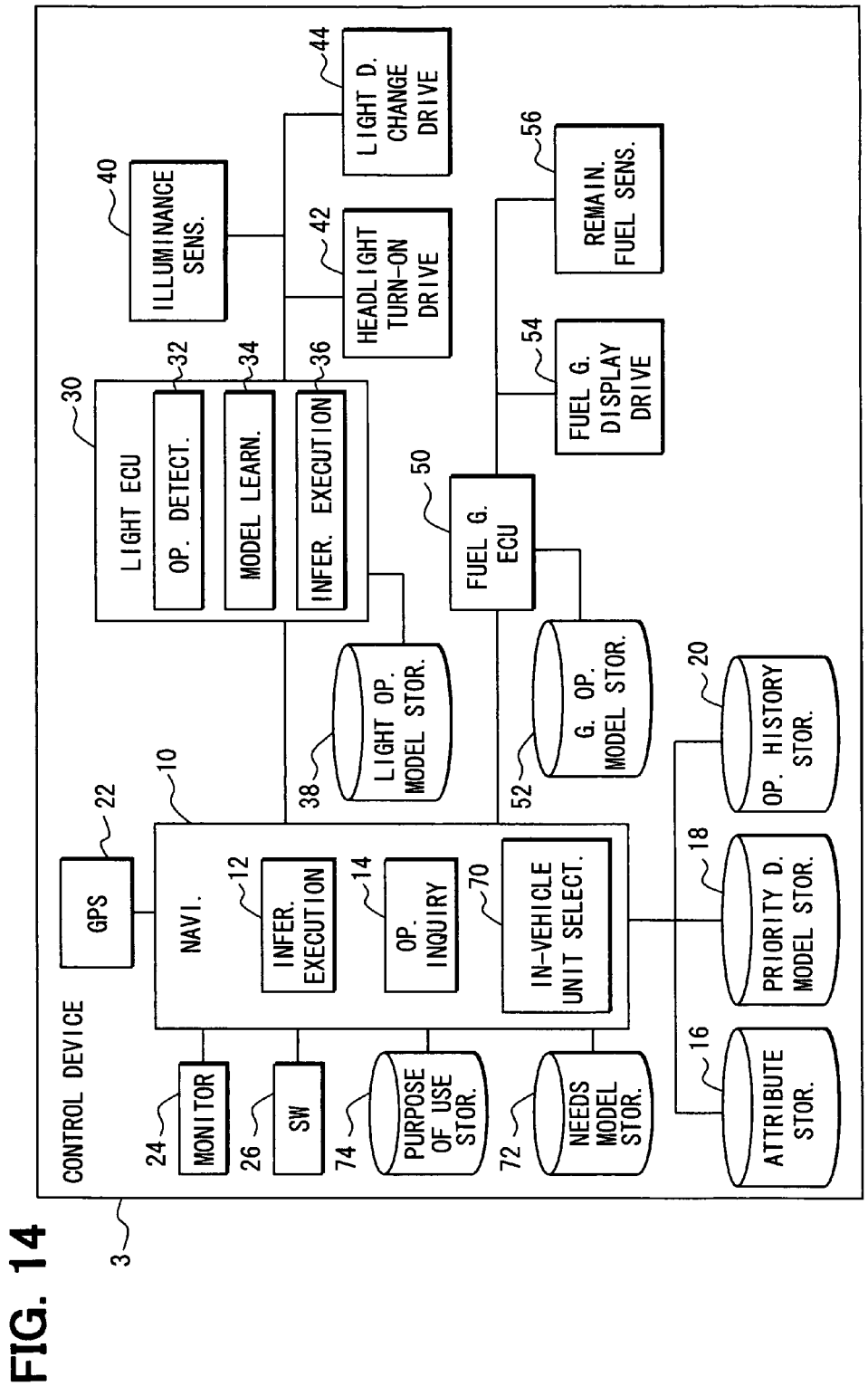
FIG. 14 is a drawing illustrating the configuration of a control device according to a third embodiment.

FIG. 14 illustrates the configuration of a control device 3 in a third embodiment of the invention. The control device 3 in the third embodiment is identical with the control device 1 in the first embodiment in basic construction. The control device 3 in the third embodiment is different from the control device 1 in the first embodiment in that the automobile navigation system 10 includes an in-vehicle unit selection unit 70.

The in-vehicle unit selection unit 70 has a function of performing the following operation: based on various situations notified from individual ECUs, it determines what needs are present in a driver, the vehicle, or the like; and it selects an in-vehicle unit capable of meeting the needs. The "needs" cited here are a particular that motivates the driver to operate each in-vehicle unit and a cause for the occurrence of "operation needs" for each in-vehicle unit. To determine the presence or absence of needs of the driver, the vehicle, or the like from various situations at the in-vehicle unit selection unit 70, a needs model storage unit 72 is connected to the automobile navigation system 10.

Figures 15, 16:
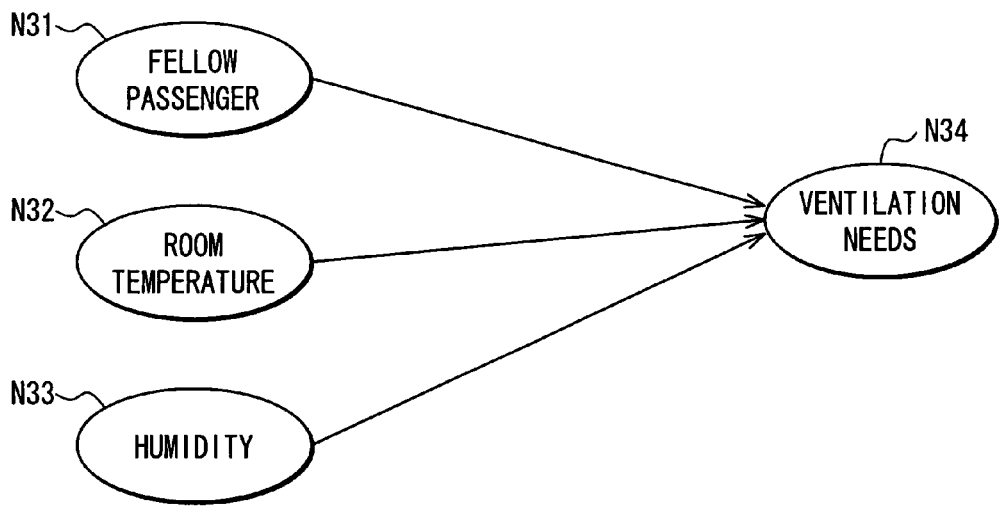
FIG. 15 is a drawing illustrating a model stored in a needs model storage unit according to the third embodiment.
FIG. 16 is a drawing illustrating an example of data stored in a purpose of use storage unit according to the third embodiment.

FIG. 15 illustrates an example of a needs model stored in the needs model storage unit 72. In the model illustrated in FIG. 15, a fellow passenger node N31 indicating the presence or absence of a fellow passenger, a room temperature node N32 indicating room temperature, and a humidity node N33 indicating humidity are connected to a node N34 indicating the presence or absence of needs for air ventilation. That is, in the needs model for determining the presence or absence of air ventilation needs, variables for fellow passenger, room temperature, and humidity have dependence between them and a variable indicating the presence or absence of air ventilation needs. Here, description is given to a needs model for determining the presence or absence of air ventilation needs; however, there are various needs models in correspondence with various needs.

The in-vehicle unit selection unit 70 sets a detected situation for such a needs model as illustrated in FIG. 15, and carries out probabilistic inference to determine the presence or absence of needs. The in-vehicle unit selection unit 70 may be so constructed as to instruct the inference execution unit 12 to carry out probabilistic inference to determine the presence or absence of needs and acquire the result of the probabilistic inference. When it is determined by inference using a needs model that there are needs, the in-vehicle unit selection unit 70 has a function of selecting an in-vehicle unit that meets the needs. To select an in-vehicle unit for meeting needs at the in-vehicle unit selection unit 70, a purpose of use storage unit 74 is connected to the automobile navigation system 10.

FIG. 16 illustrates an example of data stored in the purpose of use storage unit 74. In the purpose of use storage unit 74, there are stored data of "purpose of use" and "in-vehicle unit." The "purpose of use" is data for indicating a purpose of utilizing an in-vehicle unit, and the "in-vehicle unit" is data for specifying an in-vehicle unit. In this example, "power window actuator" for opening a window and "conditioner air exchange actuator" for exchanging air through an air conditioner are correlated to the purpose of "air ventilation." As is apparent from this example, a "purpose of use" is defined from a viewpoint of on what occasion an in-vehicle unit is used. For example, when the purpose of use is to "make external noise less irritating," "power window actuator" for closing a window and "audio" for playing music are defined. Since "purpose of use" is not a function of an in-vehicle unit, one in-vehicle unit (e.g., a power window actuator) may be correlated to multiple purposes of use as in the example illustrated in FIG. 16. The data stored in the purpose of use storage unit 74 may be generated by correlating common purposes of use or may be updated to a database suited to each driver by learning.

Figure 17:
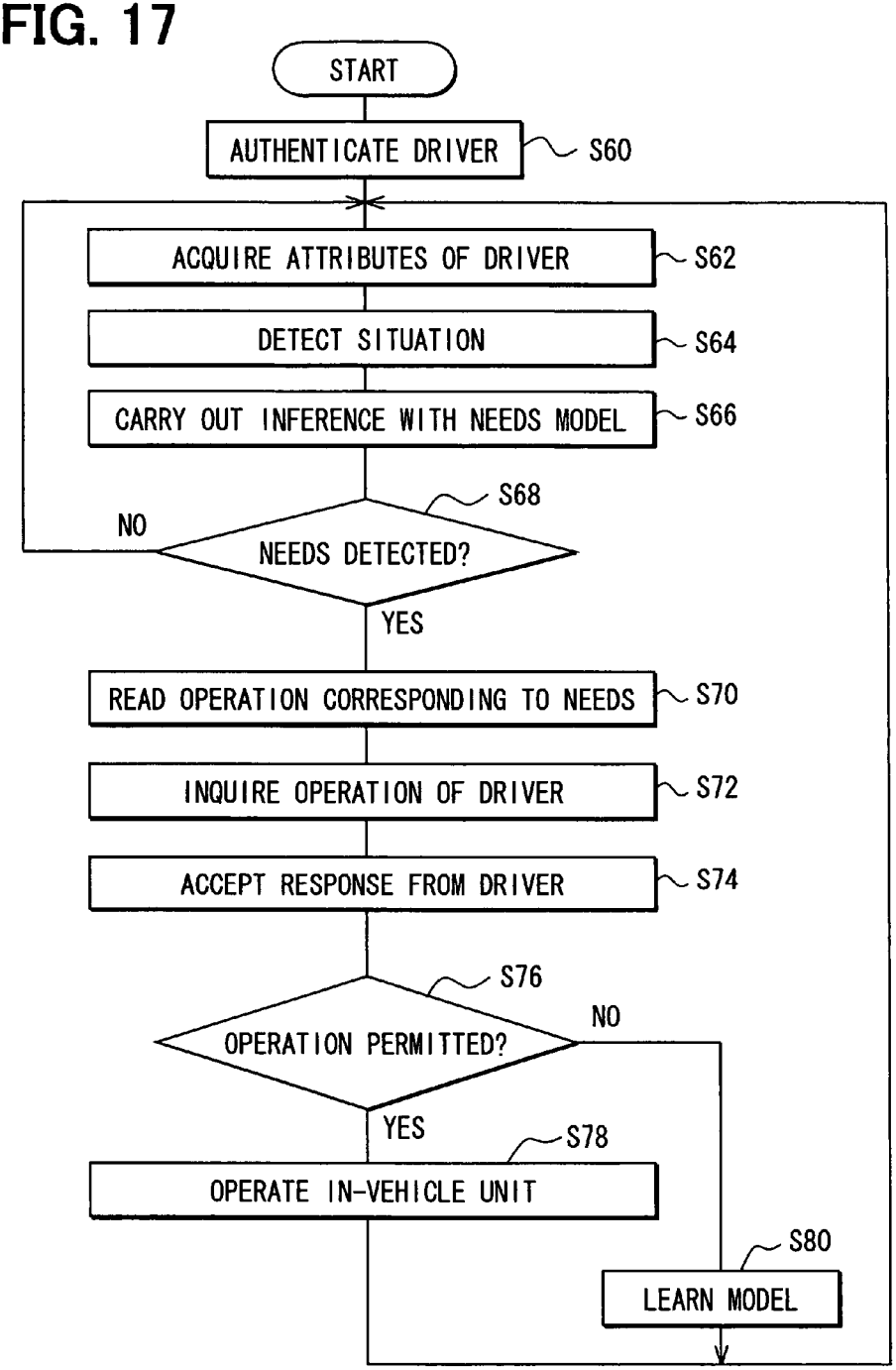
FIG. 17 is a chart illustrating the steps in the operation of a control device according to the third embodiment.

FIG. 17 illustrates operation in which an in-vehicle unit is controlled using the in-vehicle unit selection unit 70. The basic processing is the same as the processing carried out by the control device 1 described with reference to FIG. 10. The control device 3 authenticates the driver (S60), and acquires driver attributes from the driver attribute storage unit 16 (S62). Various sensors detect the situation during driving (S64).

The in-vehicle unit selection unit 70 of the control device 3 sets information on the situation acquired from each ECU (e.g., the light ECU 30, the fuel gauge ECU 50) and the driver attributes for a needs model, and carries out probabilistic inference to determine the presence or absence of needs (S66). The in-vehicle unit selection unit 70 determines whether or not needs has been detected based on whether or not the magnitude of needs has exceeded a predetermined threshold value (S68). When it is determined that needs have not been detected (NO at S68), the in-vehicle unit selection unit 70 carries out driver attribute information acquisition (S62), situation detection (S64), and inference execution (S66) to repeatedly attempt to detect needs.

When it is determined that needs have been detected (YES at S68), the in-vehicle unit selection unit 70 of the automobile navigation system 10 selects an in-vehicle unit that can meet the needs (S70). The in-vehicle unit selection unit 70 reads an in-vehicle unit corresponding to the needs and its operation from the purpose of use storage unit 74. Thus, the in-vehicle unit selection unit 70 acquires information about what operation should be performed by which in-vehicle unit.

The processing carried out after an in-vehicle unit to be operated is determined is basically the same as the processing illustrated in FIG. 10. The control device 3 makes inquiry about the operation of the in-vehicle unit (S72), accepts the driver's response to the inquiry (S74), and determines whether the operation of the in-vehicle unit has been permitted or rejected based on the accepted response (S76). When it is determined that the operation of the in-vehicle unit has been permitted (YES at S76), the control device operates the in-vehicle unit (S78); when it is determined that the operation of the in-vehicle unit has been rejected (NO at S76), the control device 3 learns the needs model without operating the in-vehicle unit (S80). Thereafter, the control device 3 returns to the step for reading driver attribute information (S62), and repeats the above-mentioned processing. Through the above processing, it is possible to detect needs according to change in the situation and assist the operation of an in-vehicle unit suitable for the needs.

The control device 3 in the third embodiment determines the presence or absence of "needs" that cause the occurrence of "operation needs" for an in-vehicle unit by inference using a needs model and selects an in-vehicle unit capable of meeting the "needs." Therefore, even an in-vehicle unit that has not been used in the past is selected as long as the in-vehicle unit can meet needs. Thus, even when the driver does not have deep understanding of in-vehicle units, an appropriate in-vehicle unit can be operated according to the situation. Recent vehicles are equipped with quite a lot of in-vehicle units, and it is difficult for the driver to understand all the in-vehicle units. In consideration of such a background, the construction of this embodiment is especially effective.

Fourth Embodiment

Figure 18:
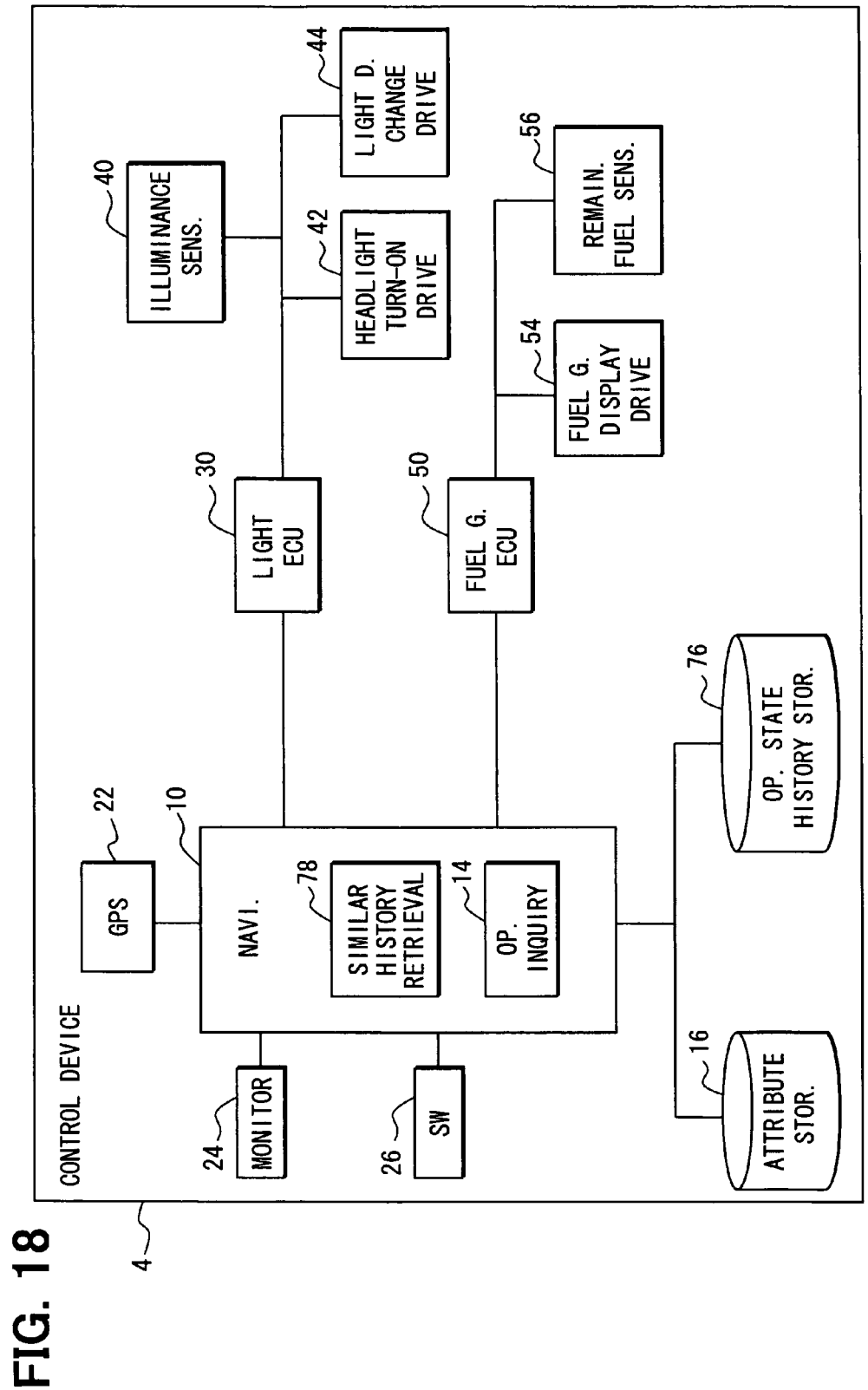
FIG. 18 is a drawing illustrating the configuration of a control device according to a fourth embodiment.

FIG. 18 illustrates the configuration of a control device 4 in a fourth embodiment of the invention. The control device 4 in the fourth embodiment stores a history of the operating state of each in-vehicle unit in an operating state history storage unit 76. The control device 4 in the fourth embodiment assists the operation of an in-vehicle unit based on history information on the operating state of the in-vehicle unit.

Figures 19, 21:
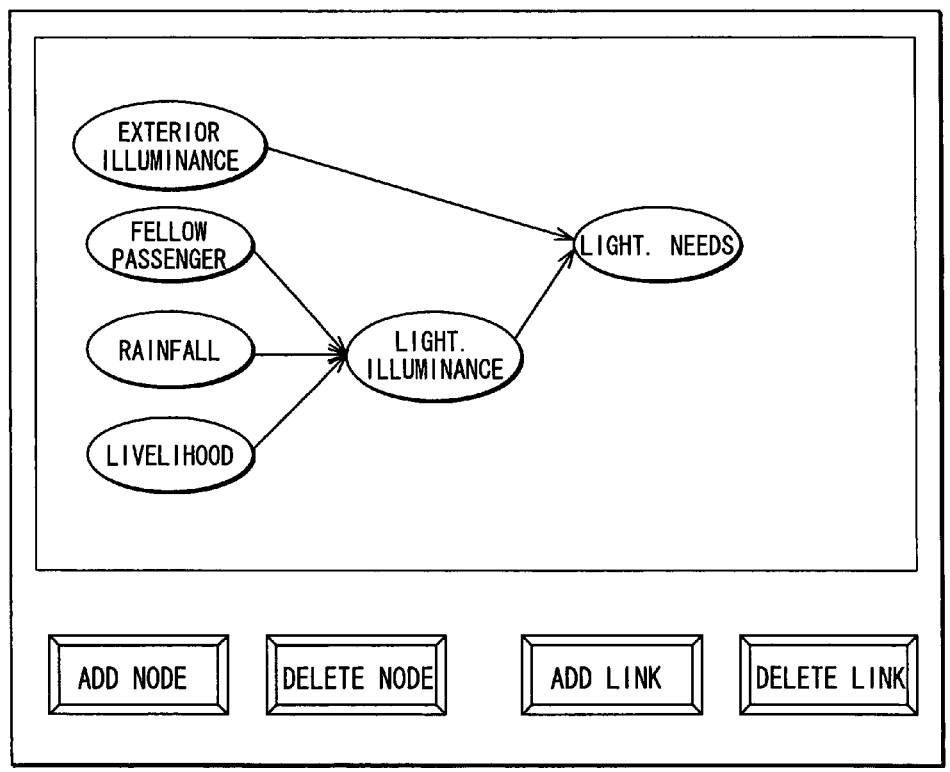
FIG. 19 is a drawing illustrating an example of data stored in an operating state history storage unit according to the fourth embodiment.
FIG. 21 is a drawing illustrating an example of a screen page for accepting a modification to a model.

FIG. 19 illustrates an example of data stored in the operating state history storage unit 76. In this example, a history of the operating state of a light is stored. In the operating state history storage unit 76, there are stored data of "amount of rainfall," "illuminance," and "operating state of light." The "amount of rainfall" is data indicating the amount of rainfall obtained when a history is acquired in six levels of 0 to 5. The data of amount of rainfall may be acquired, for example, by detection using a sensor installed on the vehicle or by estimation from the strength of wiper operation or the like. The "illuminance" is data indicating the lightness of exterior obtained when a history is acquired in 10 levels of 1 to 10. The data of illuminance is acquired by detection with the illuminance sensor 40. The "operating state" is data indicating whether or not the light is on. The operating state history storage unit 76 stores not only history data acquired when the operation of the light is detected but also history data acquired when the light is off.

The similar history retrieval unit 78 provided in the automobile navigation system 10 has a function of retrieving history data of a situation most similar to the present situation from among pieces of history data stored in the operating state history storage unit 76. The similar history retrieval unit 78 receives varied sensor information through each ECU (the light ECU 30, the fuel gauge ECU 50, etc.) and acquires the present situation. The similar history retrieval unit 78 computes the degree of similarity between the present situation and a situation indicated by history data using a "basis for distance." Concrete description will be given to a computation method below.

As an example, it will be assumed that the present situation obtained from various sensors is that the amount of rainfall is Ax and the illuminance is Bx and the situation in the nth piece of history data is that the amount of rainfall is An and the illuminance is Bn. In this case, the degree of similarity R between both pieces of data can be obtained by Expression (1) below:

$$R = \sqrt{\alpha_1(Ax - An)^2 + \alpha_2(Bx - Bn)^2} \quad (1)$$

($\alpha_1$ and $\alpha_2$ are constants)

The history data whose degree of similarity R, obtained by Expression (1) above, is lowest is history data indicating a situation most similar to the present situation. The similar history retrieval unit 78 refers to the operating state in the retrieved history data and controls an appropriate in-vehicle unit so that its operating state agrees with the operating state in the history data. Specifically, the in-vehicle unit is turned on when the history data indicates "on", and the in-vehicle unit is not turned on when the history data indicates "off." In case of an in-vehicle unit in operation, the operation may be stopped.

When the control device controls the operation of an in-vehicle unit, it carries out the same processing as in the above-mentioned embodiments. That is, the control device causes the operation inquiry unit 14 to inquire of the driver his/her intention about operation, and operates the in-vehicle unit based on his/her response to the inquiry.

The control device 4 in the fourth embodiment retrieves the history data indicating the most similar situation from among pieces of history data, and matches whether or not an in-vehicle unit is operated with whether or not the in-vehicle unit is operated in the retrieved history data. Therefore, it is possible to control in-vehicle units in correspondence with needs for operation based on the driver's action in the past.

Expression (1) described in relation to this embodiment is just an example, and the degree of similarity of history data may be determined by any expression, needless to add. The constants $\alpha_1$ and $\alpha_2$ in Expression (1) may be changed in accordance with the driver. In this case, the constants $\alpha_1$ and $\alpha_2$ can be updated using the result of acceptance of the driver's response to inquiry about operation as a teacher signal.

In this embodiment, the similar history retrieval unit 78 retrieves history data only by the degree of similarity between the present situation and a situation indicated by history data. Further, the recentness of history data may be added to a basis for retrieval. Newer history data is more reliable than older history data; therefore, retrieval is carried out using such a method that newer history data is retrieved when the degrees of similarity are at the same level. For example, the recentness of history data may be added as an element of a basis for distance, or both a variable indicating a degree of similarity R and a variable indicating the recentness of history data are weighted to obtain different comparison data.

(Modifications)

Up to this point, detailed description has been given to control devices of the invention based on embodiments. However, the invention is not limited to the above-mentioned embodiments.

In the above embodiments, ECUs such as the light ECU 30 and the fuel gauge ECU 50 and the automobile navigation system 10 as the center ECU respectively have an inference execution unit 12, 36. Because of this construction, the presence or absence of the operation needs for an in-vehicle unit is computed with the corresponding ECU, and the priorities of operation needs are computed with the automobile navigation system 10. Therefore, computation processing is decentralized, and the concentration of load can be avoided. When the automobile navigation system 10 has a high computational capacity, the invention may be so constructed that computation is all carried out at the automobile navigation system 10.

The description of the above embodiments takes as an example cases where the presence or absence of operation needs is computed with ECUs mounted in a vehicle. The computation of operation needs need not be carried out with ECUs mounted in a vehicle. The presence or absence of operation needs may be determined at a management center connected through a network. Further, an in-vehicle unit operation model may be learned by accumulating operating histories at a management center.

A management center may carry out learning with respect to each attribute of a driver to generate a model. Thus, a model suitable for the attributes of a driver can be generated. Further, a management center may carry out learning with respect to each region in which an operating history is obtained. Thus, a model suitable for regional characters can be generated.

The description of the above embodiments takes as an example a construction in which the driver is inquired above whether he/she permits or rejects operation by the operation inquiry unit 14, and the driver's response is selected by the switch 26. The construction for confirming the driver's intention is not limited to the foregoing.

For example, the invention may be so constructed that the operation of an in-vehicle unit is only presented to the driver. In this case, when the driver operates the presented in-vehicle unit, it is determined that there are operation needs; when the in-vehicle unit is not operated for a predetermined time, it is determined that there are not operation needs. An example will be taken. A message of "How about turning on the headlights?" is outputted to the driver by display or voice. When the driver turns on the headlights within one minute thereafter, it is determined that there are operation needs; when the driver does not turn them on, it is determined that there are not operation needs.

The construction for the operation inquiry unit 14 to make inquiry about operation may be omitted. Instead, the following measure may be taken: an in-vehicle unit for which the control device 1 determines that there are operation needs is operated; when the operation of the in-vehicle unit is stopped by the driver, it is determined that there are not operation needs; when the operation of the in-vehicle unit is not stopped for a predetermined time, it is determined that there are operation needs. An example will be taken. When it is determined that there are operation needs for playing music, the audio is played back without confirming whether the driver permits or rejects the operation. When the playback is stopped, it is determined that there are not operation needs; when the playback has not been stopped when one minute has passed after the audio playback was started, it is determined that there are operation needs. Some in-vehicle unit is dangerous if started without confirming the driver's intention. To cope with this, therefore, the above-mentioned determination method and the method for inquiry about operation described in relation to the above embodiments may be combined together. Or, the invention may be so constructed that a mode for inquiry about operation, favorable to the driver is learned according to the driver's response.

When there are operation needs for multiple in-vehicle units, in the above embodiments, one set of operation needs is selected using a priority determination model (Refer to S42 in FIG. 10). Instead, multiple sets of operation needs may be determined in order of priority based on the result obtained by a priority determination model. For example, operation needs for three in-vehicle units are determined in order of priority, and a message for confirming about the operations of the three in-vehicle units is displayed. In this case, for example, the invention may be so constructed that in-vehicle units are operated according to the selection by the driver using the switch 26 so designed as to select one from among options "1," "2," and "3". When the switch 26 is of touch panel type, the mode of display can be changed; therefore, options can be displayed according to the number of sets of operation needs. The invention may be so constructed that the mode of display is learned using as a teacher signal whether or not the driver responded. Thus, the display can be made to the driver's taste.

The description of the above embodiments takes as an example cases where a message inquiring whether or not the driver permits operation is displayed on the monitor 24. Instead, a message inquiring about operation may be displayed on, for example, HUD or a windshield display. Or, a message inquiring about operation may be given to the driver by a method, such as voice or a tactile display, that does not depend on visual sense.

Figure 20:
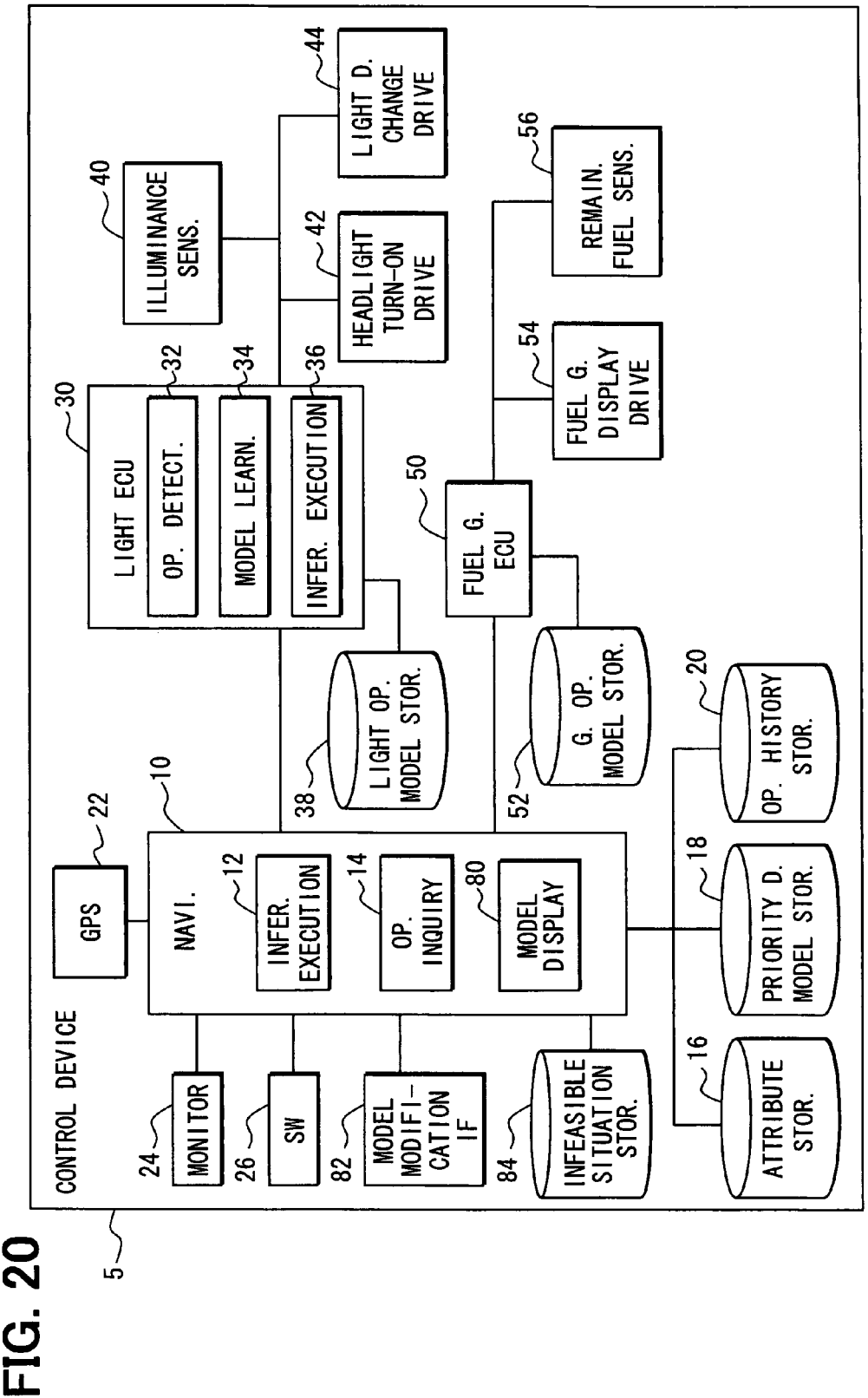
FIG. 20 is a drawing illustrating the configuration of a control device in a modification.

The above embodiments may be so constructed that they can display an in-vehicle unit operation model or a priority determination model. FIG. 20 illustrates the construction of a control device 5 in a modification. A model display unit 80 has a function of representing an in-vehicle unit operation model or a priority determination model by nodes for respective variables and a directed link that connects these nodes (Refer to FIG. 2 and FIG. 3), and outputting the model from the monitor 24. Thus, the driver can grasp which variable and which variable are related to each other at a glance, and can understand a basis for determining whether to operate an in-vehicle unit. The invention may be so constructed that a displayed in-vehicle unit operation model or priority determination model can be modified. A model modification interface 82 (i.e., a modification unit) illustrated in FIG. 20 has a function of accepting a modification to a displayed model and incorporating it into the model. FIG. 21 illustrates an example of a screen page displayed by the model modification interface 82. The driver can add or delete a node or add or delete a link in this screen page. With respect to a link, the dependence can be modified by dragging and dropping the link in a model displayed in the screen. Provision of this model modification interface 82 makes it possible to generate an appropriate model more quickly than by learning using the operating history of an in-vehicle unit.

When the driver gives permission in response to inquiry about the operation of an in-vehicle unit, in the above embodiments, that in-vehicle unit is operated. The invention may be provided with a construction for determining whether or not safety will be ensured if the in-vehicle unit is operated. As illustrated in FIG. 20, the control device 5 is provided with an operation infeasible situation storage unit 84 for storing a situation in which an in-vehicle unit should not be operated. The operation infeasible situation storage unit 84 stores a situation in which each in-vehicle unit should not be operated. With respect to the operation of opening a door, for example, "during running" is stored as a situation in which this operation should not be performed. Before an in-vehicle unit is operated, it is determined whether or not the situation at that point of time corresponds to a situation stored in the operation infeasible situation storage unit 84. When it is determined that the present situation does not correspond, the in-vehicle unit is operated. Thus, danger that may occur in conjunction with the operation of an in-vehicle unit can be avoided.

The description of the above embodiments takes as an example cases where a model is learned using various situations detected when the operation of an in-vehicle unit is detected. Data used in model learning is not limited to various situations detected when an in-vehicle unit is operated. For example, the following measure may be taken: the presence or absence of the operations of in-vehicle units, various situations, and the attributes of the driver are periodically acquired to accumulate history data; then, a model is learned using the accumulated history data. As another example, the following measure may be taken: when a predetermined situation becomes a predetermined state, the presence or absence of the operations of in-vehicle units, various situations, and the attributes of the driver are acquired to accumulate history data; then, a model is learned using the accumulated history data. Thus, since situations detected when in-vehicle units are not operated are used, the accuracy of learning can be enhanced. An example will be taken. When the driver turns on the headlights in an attempt to start driving in the nighttime, it cannot be grasped only from this operating history at what level of illuminance the lights were turned on. When the driver turned on the headlights, it had been already dark outside. Therefore, it is unknown whether the boarder between a situation in which the lights are turned on and a situation in which the lights are not turned on is. With the construction in which data indicating operating state is acquired periodically or according to change in a detected situation, data indicating operating state detected in various situations can be acquired; therefore, a model can be appropriately and quickly updated.

The description of the above embodiments has been given to control devices and their operations. The invention also includes a program for causing a computer to execute the above-mentioned processing by the control devices.

The invention is useful for control devices and the like that control multiple in-vehicle units mounted in a vehicle according to the situation.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A control device controlling in-vehicle units in a vehicle for providing an occupant of the vehicle with at least one service selected from one or more possible services, the selected service being provided to the occupant independent of a driving operation of the vehicle, the control device comprising:

a situation detection unit that detects a situation of at least one of (i) the vehicle, (ii) an occupant, and (iii) a surrounding area;

an in-vehicle service execution model storage unit for storing, with respect to each of the one or more possible services by using an associated in-vehicle unit, a model that represents association between a variable indicating the situation and a variable indicating presence of a need to start providing the each service by controlling the associated in-vehicle unit as an in-vehicle service execution model;

an inference execution unit that sets the situation detected by the situation detection unit for the variable indicating the situation in the in-vehicle service execution model with respect to each of the one or more possible services read from the in-vehicle service execution model storage unit, and determines presence of a need to start providing each of the one or more possible services;

an in-vehicle unit control unit that controls an operation of the associated in-vehicle unit based on an affirmative result of determining the presence of the need to start providing each of the one or more possible services by the inference execution unit;

an operation detection unit that detects an operation of the associated in-vehicle unit with respect to the each service, providing of which is started; and a model learning unit that learns the in-vehicle service execution model stored in the in-vehicle service execution model storage unit by using (i) a situation detected by the situation detection unit when the operation of the associated in vehicle unit with respect to the each service is detected by the operation detection unit, and (ii) an event involving the presence of the need to start providing each of the one or more possible services.

2. The control device of claim 1, further comprising:

a driver attribute storage unit for storing an attribute of a driver of the vehicle, wherein the in-vehicle service execution model storage unit further stores, with respect to the each in-vehicle unit, a model that represents association between a variable indicating the attribute, the variable indicating the situation, and the variable indicating presence or absence of operation needs for the each in-vehicle unit as the in-vehicle service execution model, the inference execution unit further sets the attribute read from the driver attribute storage unit for the variable indicating the attribute in the in-vehicle service execution model before determining presence or absence of operation needs, and the model learning unit learns the in-vehicle service execution model by further using the attribute read from the driver attribute storage unit.

3. The control device of claim 1, further comprising:

an operation inquiry unit that, when the presence of operation needs is determined by the inference execution unit, inquires of a driver of the vehicle whether or not the each in-vehicle unit is allowed to be operated, wherein when permission to operate the each in-vehicle unit is inputted in response to an inquiry from the operation inquiry unit, the each in-vehicle unit is operated.

4. The control device of claim 3, wherein the operation inquiry unit outputs a variable indicating the situation that contributes most to the operation needs in determining by the inference execution unit, as a reason for determining presence of operation needs for the each in-vehicle unit.

5. The control device of claim 3, wherein the operation inquiry unit changes a mode in which an inquiring message is outputted according to a magnitude of the presence of operation needs determined by the inference execution unit.

6. The control device of claim 3, wherein the operation inquiry unit changes a mode in which an inquiring message is outputted according to a factor of certainty of the presence of operation needs determined by the inference execution unit.

7. The control device of claim 3, wherein the inference execution unit determines the presence or absence of operation needs for the each in-vehicle unit based on a result of an inquiry about whether or not the operation of the each in-vehicle unit is allowed by the driver, and the in-vehicle service execution model stored in the model storage unit is learned using the determined presence or absence of operation needs.

8. The control device of claim 1, wherein when the in-vehicle unit control unit operates the each in-vehicle unit based on the result of determining by the inference execution unit and the operation of the each in-vehicle unit is thereafter stopped by a driver of the vehicle within a predetermined time, the model learning unit learns the in-vehicle service execution model stored in the in-vehicle service execution model storage unit using an event involving the absence of operation needs.

9. The control device of claim 1, further comprising:

an operation infeasible situation storage unit for storing information indicating a situation in which operation is infeasible with respect to the each in-vehicle unit, wherein the situation in which operation is infeasible with respect to the each in-vehicle unit is read from the operation infeasible situation storage unit before the each in-vehicle unit is operated, whether or not the situation detected by the situation detection unit agrees with the situation read from the operation infeasible situation storage unit is determined, and the each in-vehicle unit is operated when it is determined that the detected situation does not agree with the situation read from the operation infeasible situation storage unit.

10. The control device of claim 1, wherein when the in-vehicle unit control unit operates the each in-vehicle unit, it notifies a driver of the vehicle that the each in-vehicle unit is to be operated.

11. The control device of claim 1, further comprising:
an in-vehicle service execution model display unit for displaying the in-vehicle service execution model stored in the in-vehicle service execution model storage unit as a display model, in which the variable indicating the situation and the variable indicating the presence or absence of operation needs for the each in-vehicle unit are taken as nodes, and the association therebetween is indicated as a directed link that connects the nodes.

12. The control device of claim 11, further comprising:
an in-vehicle service execution model modification unit for deleting a node, add a new node, or modify a directed link, with respect to the display model on the in-vehicle service execution model display unit, wherein
an in-vehicle service execution model modified by the in-vehicle service execution model modification unit is stored in the in-vehicle service execution model storage unit.

13. The control device of claim 1, further comprising:
a purpose of use storage unit for storing a purpose of use of the each in-vehicle unit; and
a needs model storage unit for storing, with respect to each of needs, a needs model that represents association between the variable indicating the situation and a variable indicating the each of needs, wherein
the inference execution unit sets the situation detected by the situation detection unit for the variable indicating the situation in the needs model read from the needs model storage unit and determines presence or absence of needs in the situation, and
when a magnitude of the presence of needs determined by the inference execution unit is larger than a predetermined threshold value, the in-vehicle unit control unit refers to a purpose of use of the each in-vehicle unit stored in the purpose of use storage unit and selects an in-vehicle unit utilized to meet the presence of needs, and controls an operation of the selected in-vehicle unit.

14. The control device of claim 1, further comprising:
a priority determination model storage unit for storing a model that represents association between variables indicating operation needs for at least two in-vehicle units and variables indicating priorities of the at least two in-vehicle units, as a priority determination model, wherein
when the inference execution unit determines, using the in-vehicle service execution model, that there are operation needs for at least two in-vehicle units, the inference execution unit sets the operation needs for the at least two in-vehicle units for the priority determination model read from the priority determination model storage unit to thereby determine priorities of the at least two in-vehicle units, and
the in-vehicle unit control unit controls an operation of an in-vehicle unit having a high priority of the at least two in-vehicle units.

15. The control device of claim 14, further comprising:
a priority determination model display unit for displaying the priority determination model stored in the priority determination model storage unit as a display model, in which the variables indicating the operation needs for the at least two in-vehicle units and the variables indicating the priorities of the at least two in-vehicle units are taken as nodes, and the association therebetween is indicated as a directed link that connects these nodes.

16. The control device of claim 15, further comprising:
a priority determination model modification unit for deleting a node, add a new node, or modify a directed link, with respect to the display model displayed on the priority determination model display unit, wherein
a priority determination model modified by the priority determination model modification unit is stored in the priority determination model storage unit.

17. The control device of claim 14, further comprising:
an operation inquiry unit that inquires of a driver of the vehicle whether or not the at least two in-vehicle units are allowed to be operated in order of priority based on the priorities determined by the inference execution unit, wherein
when permission to operate a certain in-vehicle unit of the at least two in-vehicle units is inputted in response to an inquiry from the operation inquiry unit, the certain in-vehicle unit is operated.

18. The control device of claim 14, further comprising:
at least one electronic control unit (ECU) for controlling at least one in-vehicle unit; and
a center ECU that controls the ECU in a centralized manner, wherein computation of operation needs for the at least one in-vehicle unit based on the in-vehicle service execution model is carried out with the ECU, and
computation of priorities based on the priority determination model is carried out with the center ECU.

19. The control device of claim 18, wherein the center ECU is an ECU built in an automobile navigation system or a head-up display.

20. The control device of claim 1, wherein:
the of the one or more possible services are provided by grouped operations of at least two associated in-vehicle units.

21. The control device of claim 20, further comprising:
an operating history storage unit for storing in association with each other (i) an operating history of the each in-vehicle unit and (ii) a situation detected when the each in-vehicle unit is operated; and
a model generation unit configured to search for a combination of operations of in-vehicle units carried out in a similar situation from among the operating histories stored in the operating history storage unit, to group the retrieved combination of the operations of the at least two in-vehicle units as one of the one or more possible services, and to generate a service execution model that represents the association between the variable indicating the situation and the variable indicating the presence of execution needs for the of the one or more possible services.

22. The control device of claim 1, further comprising:
a driver attribute transmission unit for transmitting information on an attribute of a driver of the vehicle to a management center having attribute-specific in-vehicle service execution models with respect to each attribute of driver; and
a model reception unit for receiving from the management center an attribute-specific in-vehicle service execution model corresponding to the attribute of the driver included in the transmitted information.

23. The control device of claim 1, further comprising:
a position information transmission unit for transmitting information on a position of the vehicle to a management center having region-specific in-vehicle service execution models with respect to each region; and
a model reception unit for receiving from the management center a region-specific in-vehicle service execution model corresponding to the region containing the position identified by the transmitted information.

24. A control device for controlling in-vehicle units in a vehicle for providing an occupant of the vehicle with at least one service selected from one or more possible services, the selected; service being provided to the occupant independent of a driving operation of the vehicle, the control device comprising:
- a situation detection unit that detects a situation of at least one of (i) the vehicle, (ii) an occupant, and (iii) a surrounding area;
- an in-vehicle service execution model storage unit for storing, with respect to each of the one or more possible services by using an associated in-vehicle unit, a model that represents association between a variable indicating the situation and variables indicating presence of a need to start providing each of the one or more possible services by controlling the associated in-vehicle unit as an in-vehicle service execution model;
- an inference execution unit that sets the situation detected by the situation detection unit for the variable indicating the situation in the in-vehicle service execution model read from the in-vehicle service execution model storage unit, and determines presence of a need to start providing each of the one or more possible services;
- an in-vehicle unit control unit that controls an operation of the associated in-vehicle unit based on an affirmative result of determining the presence of the need to start providing each of the one or more possible services by the inference execution unit; and
- a model learning unit that periodically learns the in-vehicle service execution model stored in the in-vehicle service execution model storage unit using (i) the situation detected by the situation detection unit and (ii) an event in which the associated in-vehicle unit is operated or not.

25. A control device for controlling in-vehicle units in a vehicle for providing an occupant of the vehicle with at least one service selected from one or more possible services, the selected; service being provided to the occupant independent of a driving operation of the vehicle, the control device comprising:
- a situation detection unit that detects a situation of at least one of (i) the vehicle, (ii) an occupant, and (iii) a surrounding area;
- an in-vehicle service execution model storage unit for storing, with respect to each of the one or more possible services by using an associated in-vehicle unit, a model that represents association between a variable indicating the situation and a variable indicating presence of a need to start providing each of the one or more possible services by controlling the associated in-vehicle unit as an in-vehicle service execution model;
- an inference execution unit that sets the situation detected by the situation detection unit for the variable indicating the situation in the in-vehicle service execution model read from the in-vehicle service execution model storage unit, and determines presence of a need to start providing each of the one or more possible services;
- an in-vehicle unit control unit that controls an operation of the associated in-vehicle unit based on an affirmative result of determining the presence of the need to start providing each of the one or more possible services by the inference execution unit; and
- a model learning unit that learns the in-vehicle service execution model stored in the in-vehicle service execution model storage unit using (i) a situation detected when the situation detected by the situation detection unit becomes a predetermined state and (ii) an event in which the associated in-vehicle unit is operated or not.

26. A control device for controlling in-vehicle units in a vehicle for providing an occupant of the vehicle with at least one service selected from one or more possible services, the selected; service being provided by using an associated in-vehicle unit to the occupant independent of a driving operation of the vehicle, the control device comprising:
- a situation detection unit that detects a situation of at least one of (i) the vehicle, (ii) an occupant, and (iii) a surrounding area;
- a history storage unit for sequentially storing the situation detected by the situation detection unit and whether or not the associated in-vehicle unit is operated when the situation is detected, as history data;
- a history retrieval unit that retrieves history data indicating a situation most similar to the situation detected by the situation detection unit from the history storage unit; and
- an in-vehicle unit control unit that controls an operation of the associated in-vehicle unit to agree with whether or not the associated in-vehicle unit is operated, described in the history data retrieved by the history retrieval unit.

27. A control device for controlling in-vehicle units in a vehicle for providing an occupant of the vehicle with at least one service selected from one or more possible services, the selected service being provided by using an associated in-vehicle unit to the occupant independent of a driving operation of the vehicle, the control device comprising:
- a situation detection unit that detects;
- a history storage unit for sequentially storing the situation detected by the situation detection unit and whether or not the associated in-vehicle unit is operated when the situation is detected, as history data;
- a computational expression storage unit for storing a computational expression for obtaining a piece of comparison data from (i) recentness of the history data to be compared and (ii) a degree of similarity with the situation detected by the situation detection unit;
- a history selection unit that reads the computational expression stored in the computational expression storage unit, obtains comparison data using the read computational expression with respect to each piece of history data stored in the history storage unit, and selects one piece of history data using the obtained comparison data; and
- an in-vehicle unit control unit that controls an operation of the associated in-vehicle unit to agree with whether or not the associated in-vehicle unit is operated, described in the history data selected by the history selection unit.

28. A method for controlling in-vehicle units in a vehicle for providing an occupant of the vehicle with at least one service selected from one or more possible services, the selected service being provided by using an associated in-vehicle unit to the occupant independent of a driving operation of the vehicle based on an in-vehicle service execution model storage unit for storing, with respect to each service, a model that represents association between a variable indicating a situation of at least one of the vehicle, an occupant, and a surrounding area and a variable indicating presence of a need to start providing the each service by controlling the associated in-vehicle unit as an in-vehicle service execution model, the method comprising:
a situation detection step of detecting the situation;
an inference execution step of setting the situation detected at the situation detection step for the variable indicating the situation in the in-vehicle service execution model read from the in-vehicle service execution model storage unit and determining of a need to start providing the each service;

an in-vehicle unit control step of controlling an operation of the associated in-vehicle unit based on an affirmative result determined at the inference execution step;

an operation detection step of detecting an operation of the associated in-vehicle unit; and a model learning step of learning the in-vehicle service execution model stored in the in-vehicle service execution model storage unit using (i) the situation detected when the operation of the associated in-vehicle unit is detected at the operation detection step and (ii) an event involving the presence of the need to start providing the each service, to thereby update the in-vehicle service execution model.

29. A computer program product in a computer-readable medium for use in controlling in-vehicle units in a vehicle for providing an occupant of the vehicle with at least one service selected from one or more possible services, the selected service being provided by using an associated in-vehicle unit to the occupant independent of a driving operation of the vehicle, the product comprising:

(a) instructions for assigning an in-vehicle service execution model storage area for storing, with respect to each service, a model that represents association between a variable indicating a situation of at least one of the vehicle, the occupant, and a surrounding area and a variable indicating presence of a need to start providing the each service as an in-vehicle unit operation model;

(b) instructions for detecting the situation;

(c) instructions for setting a situation detected at the situation detection instruction for the variable indicating the situation in the in-vehicle service execution model read from the in-vehicle service execution model storage area and determining presence of the need to start providing the each service;

(d) instructions for controlling an operation of the associated in-vehicle unit based on an assertive result determined at instructions (c);

(e) instructions for detecting an operation of the associated in-vehicle unit; and (f) instructions for learning the in-vehicle service execution model stored in the in-vehicle service execution model storage area using (i) the situation detected when the operation of the associated in-vehicle unit is detected at instructions (e) and (ii) an event involving the presence of the need to start providing the each service, to thereby update the in-vehicle service execution model.

30. The control device of claim 1, wherein the selected service includes at least one of a service of lighting an outside of the vehicle, a service of announcing a gas supply, and a service of ventilating a compartment of the vehicle the occupant located.

31. A vehicular service control device in a vehicle for providing an occupant of the vehicle with a lighting service to light an outside of the vehicle by using in-vehicle lighting-related units, the lighting service being provided to the occupant independent of a driving operation of the vehicle, the control device comprising:

a situation detection unit that detects a situation of at least one of (i) the vehicle, (ii) an occupant, and (iii) a surrounding area;

an in-vehicle service execution model storage unit for storing, with respect to the lighting service, a model that represents association between a variable indicating the situation and a variable indicating presence of a need to start providing the lighting service as an in-vehicle service execution model;

an inference execution unit that sets the situation detected by the situation detection unit for the variable indicating the situation in the in-vehicle service execution model with respect to the lighting service read from the in-vehicle service execution model storage unit, and determines presence of a need to start providing the lighting service;

an in-vehicle unit control unit that controls operations of the lighting-related units based on an affirmative result of determining the presence of the need to start providing the lighting service by the inference execution unit;

an operation detection unit that detects the operations of the lighting-related units; and a model learning unit that learns the in-vehicle service execution model stored in the in-vehicle service execution model storage unit by using (i) a situation detected by the situation detection unit when the operations of the lighting-related units are detected by the operation detection unit, and (ii) an event involving the presence of the need to start providing the lighting service.

* * * * *